United States Patent
Krishnamurthy et al.

(10) Patent No.: US 12,254,128 B2
(45) Date of Patent: Mar. 18, 2025

(54) DEVICE AND METHODS FOR FACILITATING INFORMATION FLOW USING META-CONTEXT TRANSFER

(71) Applicant: SAMSUNG ELECTRONICS CO., LTD., Suwon-si (KR)

(72) Inventors: Bhargav Krishnamurthy, Karnataka (IN); Ankit Taparia, Karnataka (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/543,892

(22) Filed: Dec. 18, 2023

(65) Prior Publication Data

US 2024/0160277 A1    May 16, 2024

Related U.S. Application Data

(63) Continuation of application No. PCT/IB2023/060035, filed on Oct. 6, 2023.

(30) Foreign Application Priority Data

Nov. 15, 2022 (IN) .............................. 202241065489

(51) Int. Cl.
  *G06F 3/01* (2006.01)
(52) U.S. Cl.
  CPC .............. *G06F 3/011* (2013.01); *G06F 3/017* (2013.01)
(58) Field of Classification Search
  None
  See application file for complete search history.

(56) References Cited

U.S. PATENT DOCUMENTS

| 8,370,370 B2 | 2/2013 | Huang et al. |
| 10,970,547 B2 | 4/2021 | Faulkner |
| 11,210,518 B2 | 12/2021 | Laaksonen et al. |

(Continued)

FOREIGN PATENT DOCUMENTS

| JP | 7381581 B2 | 11/2023 |
| KR | 10-2019-0079441 A | 7/2019 |

OTHER PUBLICATIONS

International Search Report (PCT/ISA/210) and Written Opinion (PCT/ISA/237) issued by the International Searching Authority on Jan. 9, 2024 in International Application No. PCT/IB2023/060035.

*Primary Examiner* — Benjamin C Lee
*Assistant Examiner* — Emily J Frank
(74) *Attorney, Agent, or Firm* — Sughrue Mion, PLLC

(57) ABSTRACT

A method of controlling an electronic device for enabling a context transfer from a virtual session to an environment external to the virtual session, includes detecting at least one user in an a virtual session; based on detecting the at least one user, obtaining a context of at least one virtual device content present in the virtual session, based on detecting the at least one user; obtaining at least one user interest related with the at least one virtual device content using at least one user input in the virtual session; obtaining correlation information between the at least one user interest and at least one content capability of a plurality of real world user devices of the at least one user; and providing at least one real world user device, among the plurality of user devices, to the at least one user for transferring the context of the at least one virtual device content based on the correlation information.

15 Claims, 22 Drawing Sheets

(56) References Cited

U.S. PATENT DOCUMENTS

| | | |
|---|---|---|
| 11,620,799 B2 | 4/2023 | Berliner et al. |
| 12,032,728 B2 | 7/2024 | Munro et al. |
| 2002/0113809 A1 | 8/2002 | Akazawa et al. |
| 2009/0037822 A1 | 2/2009 | Kandekar et al. |
| 2014/0115140 A1 | 4/2014 | Jin |
| 2017/0219367 A1 | 8/2017 | Liu et al. |
| 2018/0077451 A1 | 3/2018 | Yip et al. |
| 2021/0216349 A1 | 7/2021 | Munro et al. |
| 2024/0056492 A1* | 2/2024 | Burns .................... H04N 7/157 |
| 2024/0085982 A1* | 3/2024 | Huang .................... G06F 3/011 |
| 2024/0161375 A1* | 5/2024 | Mahajan ................. G06F 3/017 |
| 2024/0203066 A1* | 6/2024 | Kawashima ........ G06F 3/04842 |
| 2024/0353918 A1 | 10/2024 | Munro et al. |

\* cited by examiner

DEVICE AND METHODS FOR FACILITATING INFORMATION FLOW USING META-CONTEXT TRANSFER

CROSS-REFERENCE TO RELATED APPLICATION

This application is a bypass continuation of International Application No. PCT/IB2023/060035, filed on Oct. 6, 2023, which is based on and claims priority to India Patent Application No. 202241065489, filed on Nov. 15, 2022, in the Intellectual Property India, the disclosures of which are incorporated by reference herein in their entireties.

BACKGROUND

1. Field

Embodiments disclosed herein relate to enabling sustainable information exchange across virtual and real worlds, and more particularly to a device and methods for transferring a user preferred virtual or metaverse context to a best possible real world device of the user.

2. Description of Related Art

A metaverse may be defined as a virtual shared space created by the convergence of a virtually enhanced physical reality and physically persistent virtual space. In the metaverse, users may be immersed using Virtual Reality (VR) technology, and multiple users may contribute to the ecosystem or virtual environment.

Existing virtual world systems provide an automatic information sharing mechanism for facilitating information sharing between software objects created in Web applications and 3D virtual world objects created in virtual world applications. Thus, the system deals with transaction of information between previously linked web objects with the virtual world.

FIG. 1 depicts an existing system 100 for a metaverse session. The system 100 facilitates multiple users to participate in the metaverse session using multiple virtual devices. Once the session is initiated, data in the metaverse may be captured from multiple user actions such as gestures, emotions, facial expressions, etc. Each user in the metaverse session may be represented with a virtual avatar, and the virtual avatar replicates the user's real world actions in the metaverse session using the VR technology. The system 100 is configured to change the environment in the metaverse session instantly whenever required based on user preferences being conducted such as a party, a meeting, etc. The system 100 captures multiple interests of the user in the metaverse session based on user data such as multiple user actions and the environment data. The multiple interests of the user may be, but not limited to a song in a party, ambience of the party, a document in a meeting, etc. For example, the user may like the song played in the party and utter "Wow! I like this song in the party". The uttered sound may be captured as user data by the system 100 for processing and determining the user interest. However, once the user exits the metaverse session, the user interests determined in the metaverse session may also be lost.

Further, employees of a company meet virtually, a system is known for managing (or obtaining) data discussed in a mixed reality call. The system provides intelligent agents for managing (or obtaining) data associated with objects that are displayed within mixed-reality and virtual-reality collaboration environments. Individual agents are configured to collect, analyze, and store data associated with individual objects in a shared view. Therefore, the system creates objects out of the information discussed in the meeting and shares the information among all parties in the call using the intelligent agents.

However, such systems do not disclose a correlation of user input with capabilities of one or more real world devices of the user. Further, the systems do not disclose enabling a user to share personalized information of a meeting performed by the user in a metaverse session, without creating intelligent agents.

SUMMARY

Provided are a device and methods for enabling sustenance of relevant and useful information across real and virtual worlds.

Further, provided are a device and methods for bridging the virtual and real worlds to allow transfer of user preferred virtual or metaverse context to one or more best possible real world devices in user's real world environment.

Further still, provided are a device and methods for determining one or more user's interests in a virtual session maintaining the information even after the virtual session has been terminated.

Further still, provided are a device and methods for analyzing the virtual information for finding a suitable scenario in the real world.

Further still, provided are a device and methods for correlating the capability of one or more user's real world devices with that of the virtual information to find the best possible real world device for transferring the virtual context.

Further still, provided are a device and methods for recognizing the real and virtual world objects discussed in a meeting for sharing the virtual information amongst various parties in the meeting.

According to an aspect of the disclosure, a method of controlling an electronic device for enabling a context transfer from a virtual session to an environment external to the virtual session, includes: detecting at least one user in an virtual session; obtaining a context of at least one virtual device content present in the virtual session based on detecting the at least one user; obtaining at least one user interest related with the at least one virtual device content using at least one user input in the virtual session; obtaining correlation information between the at least one user interest and at least one content capability of a plurality of user devices; and providing at least one user device to the at least one user for transferring the context of the at least one virtual device content based on the correlation information.

The method further may further include connecting a plurality of VR elements in the virtual session, and wherein the plurality of VR elements are configured to: obtain a plurality of physical properties of the virtual session, wherein the plurality of physical properties comprises at least one of a gesture, movement, and context; render a plurality of visual elements of the virtual session; and provide information regarding starting and ending of the virtual session.

The at least one virtual device content may include at least one of an audible content, a visual content, an audio-visual content, and an ambience of the virtual session.

The at least one user interest may be obtained using at least one of an explicit user action and an implicit user action in the virtual session.

The at least one content capability of the plurality of user devices may include at least one of an audio capability, a video capability, an internet capability, a display capability, and an ambience control capability.

The obtaining the context of the at least one virtual device content may include: scanning a virtual environment in which the virtual session takes place for identifying the at least one virtual device content displayed in the virtual session which is originating from at least one participating user or a central entity; applying a detecting mechanism to the identified at least one virtual device content; and obtaining the context of the at least one virtual device content, based on the detecting mechanism.

The at least one user input may include at least one of a speech input, a gaze input, and a gesture input.

The obtaining the at least one user interest using the at least one user input may include: detecting at least one avatar action of the at least one user; obtaining correlation information between the at least one avatar action and a plurality of interests of the at least one user; classifying between objects in the environment external to the virtual session and the virtual session to determine an intent of the at least one user; and obtaining the at least one user interest based on the intent of the at least one user.

The obtaining the correlation information may include: obtaining at least one user activity in the environment external to the virtual session for identifying at least one real-world context relevant to the obtained at least one user interest; classifying each of the plurality of user devices into a data structure that lists one or more capabilities of a respective user device, the at least one content capability of the plurality of user devices extracted from a respective data structure; identifying the user devices which are in proximity of the at least one user; and obtaining the data structures and stored metadata information of the at least one user interest for identifying and providing the at least one user device from the user devices in proximity of the at least one user for transferring the context of the at least one virtual device content.

The virtual session may be implemented in a metaverse environment.

The electronic device may be present in the environment external to the virtual session.

According to an aspect of the disclosure, an electronic device for enabling context transfer from a virtual session to an environment external to the virtual session, includes: a processor configured to: detect at least one user in an virtual session; obtain a context of at least one virtual device content present in the virtual session based on detecting the at least one user; obtain at least one user interest related with the at least one virtual device content using at least one user input in the virtual session; obtain correlation information between the at least one user interest and at least one content capability of a plurality of user devices of the at least one user; and providing at least one user device to the at least one user for transferring the context of the at least one virtual device content based on the correlation information.

According to an aspect of the disclosure, a system for enabling context transfer from a virtual session to an environment external to the virtual session, includes: a processor to operate the virtual session using at least one electronic device, wherein the processor comprises: a plurality of virtual modules, and wherein each of the plurality of virtual modules comprises: a session manager configured to detect at least one user in the virtual session; a virtual scanner configured to obtain a context of at least one virtual device content present in the virtual session based on detecting the at least one user; an interest detection module configured to obtain at least one user interest related with the at least one virtual device content using at least one user input in the virtual session through a multimodal interest engine; a plurality of user device modules, and wherein each of the plurality of user device modules comprises: a capability abstractor configured to obtain correlation information between the at least one user interest and at least one content capability of a plurality of user devices of the at least one user; and an intelligent device identification engine configured to provide at least one real world device to the at least one user for transferring the context of the at least one virtual device content based on the correlation information.

The system may interface to a plurality of VR elements in the virtual session, and each of the plurality of VR elements may include: a physics module configured to obtain a plurality of physical properties of the virtual session, wherein the plurality of physical properties comprises at least one of a gesture, movement, and context; a renderer module configured to render a plurality of visual elements of the virtual session; and a session module configured to provide information regarding starting and ending of the virtual session.

The at least one virtual device content may include at least one of an audible content, a visual content, an audio-visual content, and an ambience of the virtual session.

The at least one user interest may be obtained using at least one of an explicit user action and an implicit user action in the virtual session.

The at least one content capability of the plurality of user devices may include at least one of an audio capability, a video capability, an internet capability, a display capability, and an ambience control capability.

The virtual scanner may be configured to: scan a virtual environment in which the virtual session takes place for identifying the at least one virtual device content displayed in the virtual session which is originating from at least one participating user or a central entity; apply a detecting mechanism to the identified at least one virtual device content; and obtain the context of the at least one virtual device content, based on the detecting mechanism.

The at least one user input may be at least one of a speech input, a gaze input, and a gesture input.

The interest detection module may be further configured to: detect at least one avatar action of the at least one user; obtain correlation information between the at least one avatar action and a plurality of interests of the at least one user; classify between objects in the environment external to the virtual session and the virtual session to determine an intent of the at least one user; and obtain the at least one user interest based on the intent of the at least one user.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
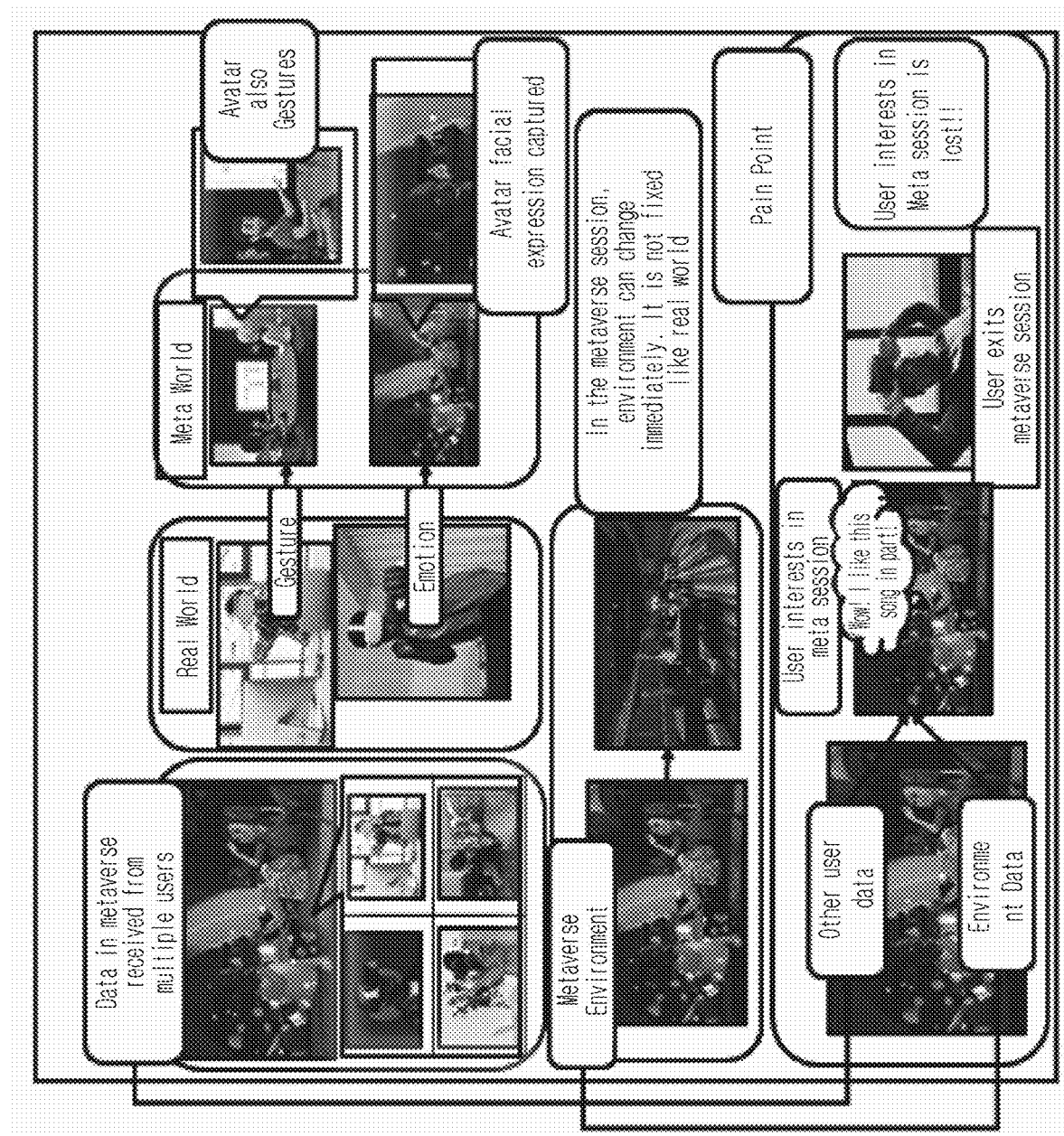
FIG. 1 illustrates is a diagram an existing system for the metaverse session.

Embodiments of the disclosure and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "one or more embodiments," or similar language means that a particular feature, structure, or characteristic described in connection with the indicated embodiment is included in at least one embodiment of the present solution. Thus, the phrases "in one embodiment", "in one or more embodiments," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

The embodiments herein disclose a device and methods for providing an information transfer from a virtual or metaverse session to a best possible real world device, for example internet of things (IoT) device, in a user's real world environment. The embodiments provide an intelligent intuitive way of transferring content from the virtual world to the real world by correlation information of user's real device capabilities. Referring now to the drawings, and more particularly to FIGS. 2 through 18, where similar reference characters denote corresponding features consistently throughout the figures, there are shown embodiments.

Figure 2:
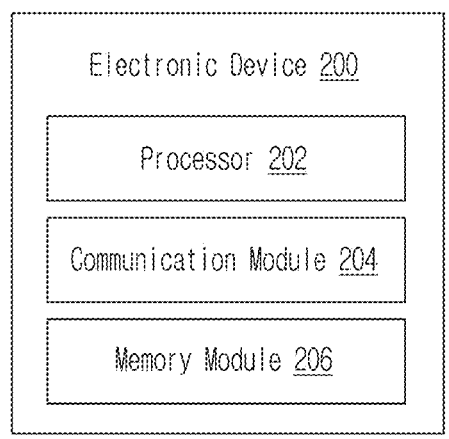
FIG. 2 is a diagram illustrating an electronic device for enabling a context transfer from a virtual world to a real world, according to one or more embodiments.

FIG. 2 is a block diagram illustrating an electronic device 200 for enabling a context transfer from a virtual world to a real world, according to one or more embodiments. The electronic device 200 comprises a processor 202, a communication module 204, and a memory module 206. The electronic device 200 may be a real world device (also referred to as a "user device") present in the real world environment of the user. For example, a real world device may correspond to a physical device that has the capability of connecting to a virtual environment. Examples of the electronic device 200 may be, but not limited to, a desktop, a laptop, a smart phone, a personal digital assistant, a wearable device, and so on.

In one or more embodiments herein, the processor 202 may be configured to detect at least one user in an on-going virtual session. The virtual session may be implemented in a metaverse environment, or any other virtual environment known to one of ordinary skill in the art. A plurality of virtual reality (VR) elements may be utilized for interfacing of the electronic device 200 in the virtual session.

Figure 3:
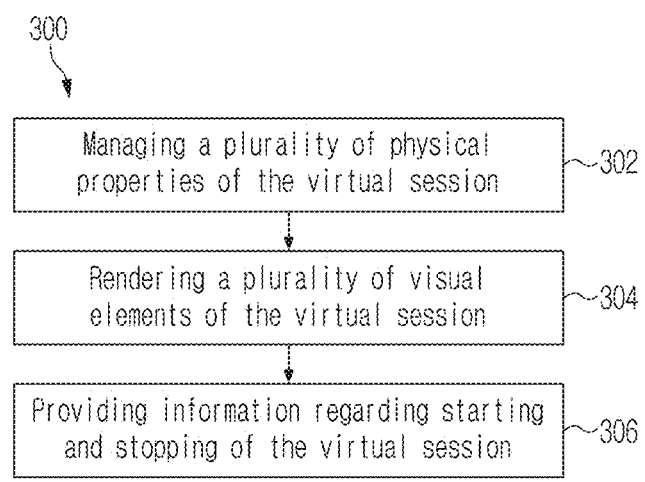
FIG. 3 is a flowchart illustrating a method for interfacing the VR elements by the electronic device in the virtual session, according to one or more embodiments.

FIG. 3 is a flowchart illustrating a method 300 for interfacing (or connecting) the VR elements by the electronic device 200 in the virtual session, according to one or more embodiments. The method 300 discloses managing (or obtaining) a plurality of physical properties of the virtual session, as depicted in operation 302. The plurality of physical properties may be, but not limited to, a gesture, movement, context, and so on. Subsequently, the method 300 discloses rendering a plurality of visual elements of the virtual session, as depicted in operation 304. Thereafter, the method 300 discloses providing information regarding starting and ending of the virtual session, as depicted in operation 306. The various actions in method 300 may be performed in the order presented, in a different order or simultaneously. Further, in some embodiments, some actions listed in FIG. 3 may be omitted.

The processor 202 may determine (or obtain) a context of at least one virtual device content present in the virtual session, in response to detecting the user. The virtual device content may be, but not limited to, an audible content, a visual content, an audio-visual content, an ambience of the virtual session, and so on.

Figure 4:
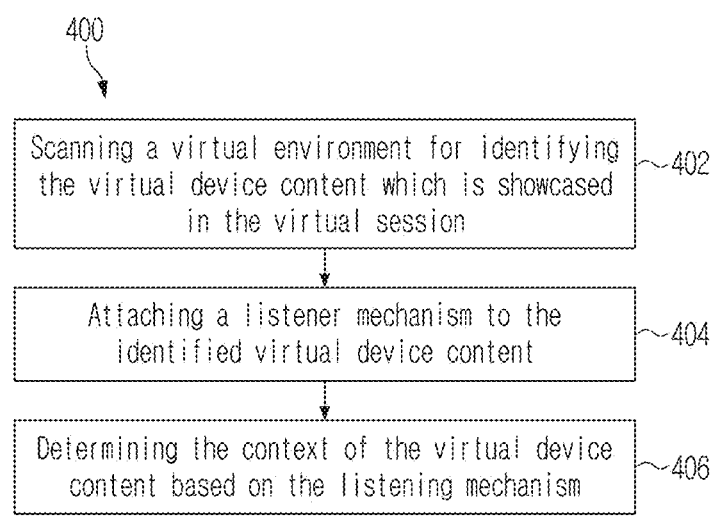
FIG. 4 is a flowchart illustrating a method for determining a context of the virtual device content, according to one or more embodiments.

FIG. 4 is a flowchart illustrating a method 400 for determining the context of the virtual device content, according to one or more embodiments. The method 400 discloses scanning a virtual environment for identifying the virtual device content which has been showcased in the virtual session, as depicted in operation 402. In one or more examples, virtual device content may be showcased by displaying the content more prominently than other content. For example, the size of the showcased content may be displayed larger than other content, or may be highlighted with a different color than other content. The virtual device content may be from at least one participating user or a central entity. Subsequently, the method 400 discloses attaching (or applying) a listening mechanism to the identified virtual device content, as depicted in operation 404. The listening mechanism monitors and observes for changes in the virtual device content. Thereafter, the method 400 discloses determining the context of the virtual device content, based on the listening mechanism, as depicted in operation 406. For example, the context may comprise at least one of a song to which the user expresses interest by listening and dancing to the song, an ambience to which the user expresses interest, a document etc. The various actions in method 400 may be performed in the order presented, in a different order or simultaneously. Further, in some embodiments, some actions listed in FIG. 4 may be omitted. The listening mechanism may be described as a pre-determined mechanism or a detecting mechanism. In one or more examples, the mechanism may be implemented as an algorithm.

The processor 202 may derive (or obtain or extract) at least one user interest towards the virtual device content using at least one multimodal user input within the virtual session. The user interest may be derived using at least one of an explicit user input and an implicit user input in the virtual session. Examples of the multimodal user input may be, but not limited to, a speech input, a gaze input, a gesture input, etc.

Figure 5:
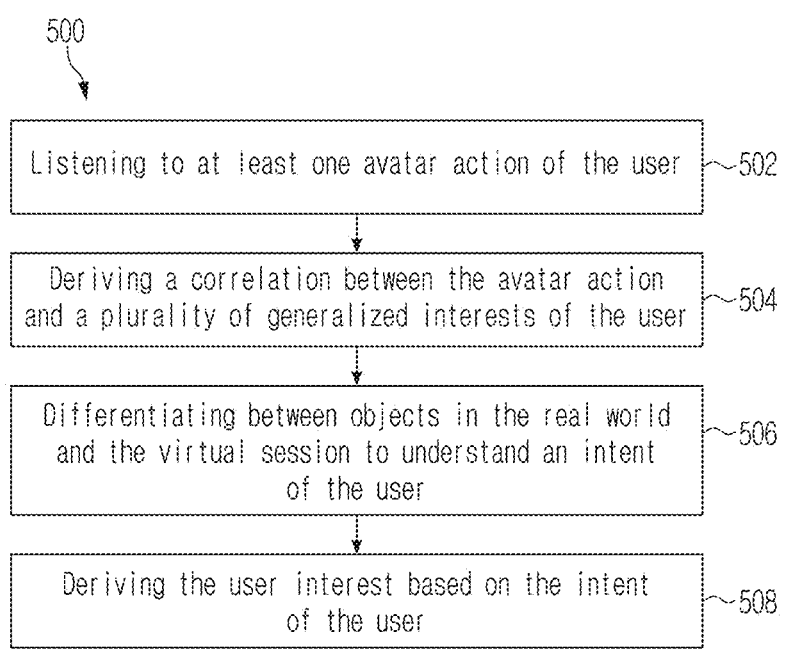
FIG. 5 is a flowchart illustrating a method for deriving (or obtaining or extracting) a user interest using a multimodal user input, according to one or more embodiments.

FIG. 5 is a flowchart illustrating a method 500 for deriving at least one user interest using the multimodal user input, according to one or more embodiments. The method 500 discloses listening (or detecting) to at least one avatar action of the user, as depicted in operation 502. Subsequently, the method 500 discloses deriving (or obtaining or extracting) correlation information between the avatar action and a plurality of generalized interests of the user, as depicted in operation 504. The correlation information may be derived through score representation. For example, a score may be assigned between an avatar action and an interest representing a correlation between these items. If the score is above a threshold, the avatar action and interest may be designated as being correlated with each other. Thereafter, the method 500 discloses differentiating (or classifying) between objects in the real world and the virtual session based on the derived correlation, to understand or determine an intent of the user, as depicted in operation 506. The method 500 further discloses deriving the user interest based on the intent of the user, as depicted in operation 508. The various actions in method 500 may be performed in the order presented, in a different order or simultaneously. Further, in some embodiments, some actions listed in FIG. 5 may be omitted.

The processor 202 may correlate the user interest with at least one content capability of a plurality of real world devices of the user. The content capability of the real world devices may be, but not limited to an audio capability, a video capability, an internet capability, a display capability, an ambience control capability, and so on.

Figure 6:
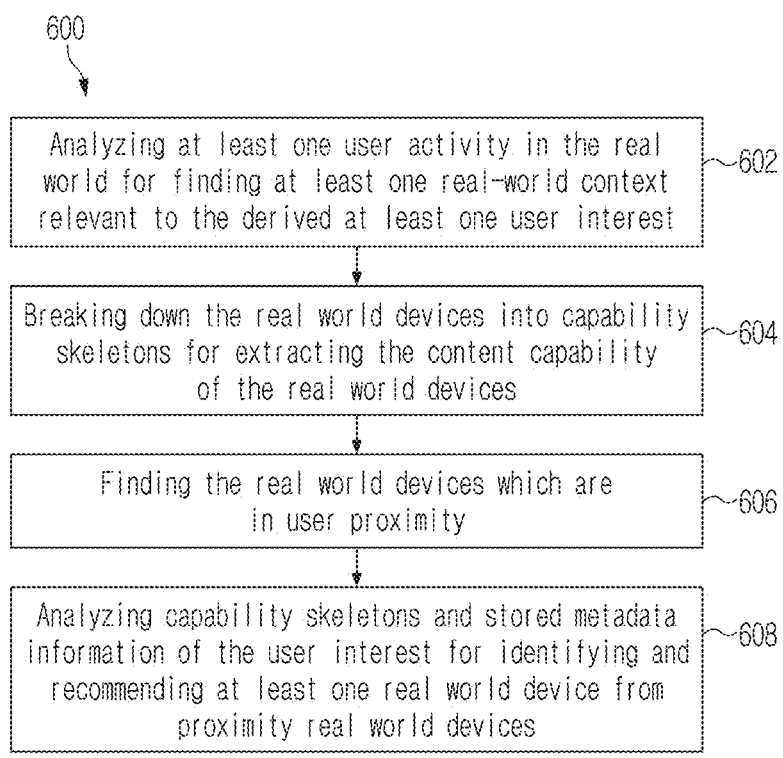
FIG. 6 is a flowchart illustrating a method for correlating the user interest with the content capability of the real world devices, according to one or more embodiments.

FIG. 6 is a flowchart illustrating a method 600 for correlating the user interest with the content capability of the plurality of real world devices, according to one or more embodiments. The method 600 discloses analyzing (or obtaining) at least one user activity in the real world for finding at least one real-world context relevant to the derived user interest, as depicted in operation 602. Subsequently, the method 600 discloses breaking down (or classifying) the plurality of real world devices into capability skeletons for extracting the content capability of the real world devices, as depicted in operation 604, on finding the real-world context. In one or more examples, a capability skeleton is a data structure that specifies one or more capabilities of a device. Thereafter, the method 600 discloses finding the real world devices which are in user proximity, as depicted in operation 606, on breaking down the plurality of real world devices into the capability skeletons. The method 600 further discloses analyzing the capability skeletons and stored metadata information of the user interest for identifying and recommending (or providing) at least one real world device from the proximity real world devices, as depicted in operation 608. The various actions in method 600 may be performed in the order presented, in a different order or simultaneously. Further, in some embodiments, some actions listed in FIG. 6 may be omitted.

Thus, the processor 202 may recommend at least one real world device to the user for transferring the context of the virtual device content based on the analyzed capability skeletons of the real world devices and stored metadata information of the user interest.

In one or more embodiments herein, the processor 202 may comprise one or more of microprocessors, circuits, and other hardware configured for processing. The processor 202 may be configured to execute instructions stored in the memory module 206.

In one or more examples, the processor 202 may be at least one of a single processor, a plurality of processors, multiple homogeneous or heterogeneous cores, multiple Central Processing Units (CPUs) of different kinds, microcontrollers, special media, and other accelerators. The processor 202 may be an application processor (AP), a graphics-only processing unit such as a graphics processing unit (GPU), a visual processing unit (VPU), and/or an Artificial Intelligence (AI)-dedicated processor such as a neural processing unit (NPU).

In one or more embodiments herein, the communication module 204 may be configured to enable communication between the electronic device 200 and a server through a network or cloud. The server may be configured or programmed to execute instructions of the electronic device 200. The communication module 204 through which the electronic device 200 and the server communicate may be in the form of either a wired network, a wireless network, or a combination thereof. The wired and wireless communication networks may comprise but not limited to, GPS, GSM, LAN, Wi-Fi compatibility, Bluetooth low energy as well as NFC. The wireless communication may further comprise one or more of Bluetooth (registered trademark), ZigBee (registered trademark), a short-range wireless communication such as UWB, a medium-range wireless communication such as Wi-Fi (registered trademark) or a long-range wireless communication such as 3G/4G or WiMAX (registered trademark), according to the usage environment.

In one or more embodiments herein, the memory module 206 may comprise one or more volatile and non-volatile memory components which are capable of storing data and instructions to be executed. Examples of the memory module 206 may be, but not limited to, NAND, embedded Multi Media Card (eMMC), Secure Digital (SD) cards, Universal Serial Bus (USB), Serial Advanced Technology Attachment (SATA), solid-state drive (SSD), and so on. The memory module 206 may also include one or more computer-readable storage media. Examples of non-volatile storage elements may include magnetic hard discs, optical discs, floppy discs, flash memories, or forms of electrically programmable memories (EPROM) or electrically erasable and programmable (EEPROM) memories. In addition, the memory module 206 may, in some examples, be considered a non-transitory storage medium. The term "non-transitory" may indicate that the storage medium is not embodied in a carrier wave or a propagated signal. However, the term "non-transitory" should not be interpreted to mean that the memory module 206 is non-movable. In certain examples, a non-transitory storage medium may store data that can, over time, change (e.g., in Random Access Memory (RAM) or cache).

FIG. 2 shows example modules of the electronic device 200. However, as understood by one of ordinary skill in the art, the embodiments are not limited to this configuration. In other embodiments, the electronic device 200 may include less or more number of modules. Further, the labels or names of the modules are used only for illustrative purpose and does not limit the scope of the embodiments. One or more modules may be combined together to perform same or substantially similar function in the electronic device 200.

Figure 7:
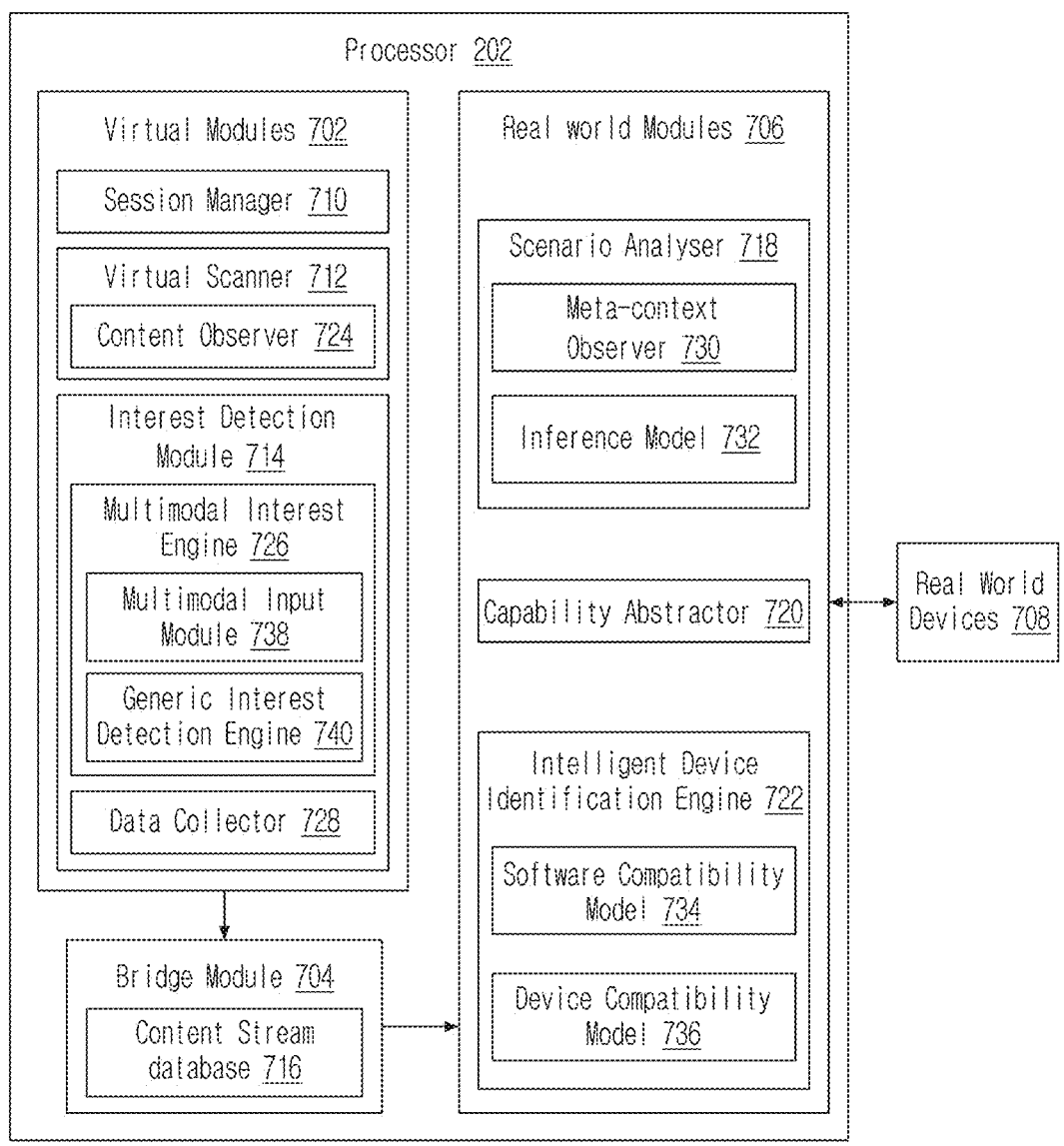
FIG. 7 is a block diagram illustrating a processor for enabling the context transfer from a metaverse virtual session to a real world, according to one or more embodiments.

FIG. 7 is a block diagram illustrating a processor 202 for enabling the context transfer from a virtual session to a real world according to one or more embodiments. The virtual session may be a metaverse session which is implemented in a meta world. However, as understood by one of ordinary skill in the art, the embodiments are not limited to a metaverse session and may include any suitable virtual environment known to one of ordinary skill in the art. The processor 202 further comprises a plurality of virtual modules 702, a bridge module 704, and a plurality of real modules 706. The plurality of virtual modules 702 may be metaverse modules that perform one or more functions in a virtual environment. The virtual modules 702 further comprise a session manager 710, a virtual scanner 712, and an interest detection module 714. In one or more embodiments herein, the session manager 710 may be configured for detecting at least one user in the virtual session or in the metaverse session. The session manager 710 may serve as an interface to the plurality of VR elements in the virtual session.

Figure 8:
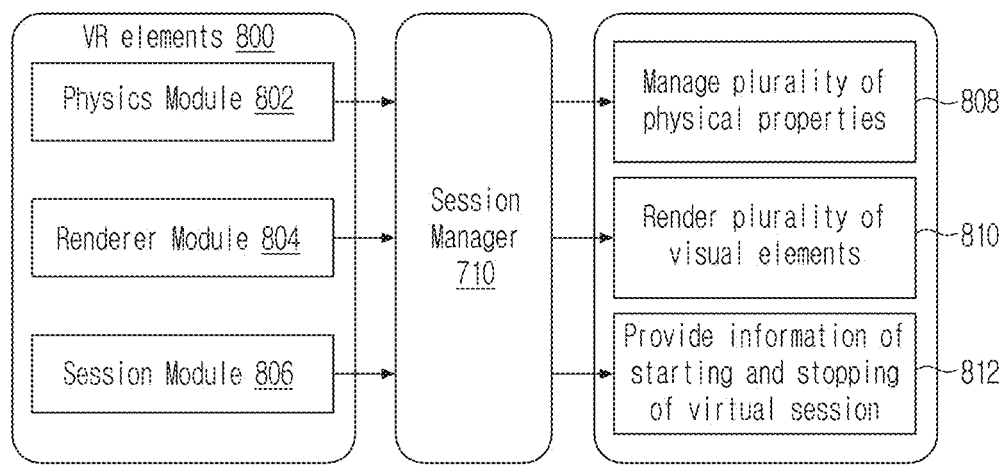
FIG. 8 is a block diagram illustrating the VR elements in the virtual session or metaverse session, according to one or more embodiments.

FIG. 8 is a block diagram illustrating the VR elements 800 in the virtual session or metaverse session, according to one or more embodiments. The processor 202 may interface with the VR elements 800 through the session manager 710 for implementing the virtual session. The VR elements 800 comprise a physics module 802, a renderer module 804, and a session module 806. In one or more embodiments herein, the physics module 802 may be configured for managing (or obtaining) a plurality of physical properties of the virtual session, as depicted in operation 808. Examples of the physical properties may be, but not limited to, a gesture, movement, and context which are performed by the user. In one or more embodiments herein, the renderer module 804 may be configured for rendering a plurality of visual elements in the virtual session, as depicted in operation 810. The renderer module 804 may be used for scanning the rendered visual elements in the virtual scanner 712. In one or more embodiments herein, the session module 806 may be configured for providing information regarding starting and ending the virtual session, as depicted in operation 812. FIG. 8 shows example modules of the VR elements 800. However, as understood by one of ordinary skill in the art, the embodiments are not limited to the configuration illustrated in FIG. 8. In other embodiments, the VR elements 800 may include less or more number of modules. Further, the labels or names of the modules are used only for illustrative purpose and does not limit the scope of the embodiments.

One or more modules may be combined together to perform same or substantially similar function in the VR elements 800.

In one or more embodiments herein, the virtual scanner 712 may be configured for determining the context of at least one virtual device content present in the virtual session in response to detecting the user. The virtual scanner 712 may scan or check the virtual environment on detecting the user in the virtual session for determining the virtual device content. Examples of the virtual device content may be, but not limited to, a song being played in the virtual session, a video being played in the virtual session, an ambience in a virtual session, an utterance by a user during a virtual session, and a slide or document from a virtual meeting in the virtual session.

In one or more embodiments herein, the virtual scanner 712 may be configured for scanning the virtual environment for different types of content (e.g., the virtual device content showcased in the virtual session). The virtual device content may be retrieved from the scanned content in an immediate vicinity of the user. The virtual scanner 712 may attach a listening mechanism using a content observer 724 to the identified virtual device content.

Figure 9:
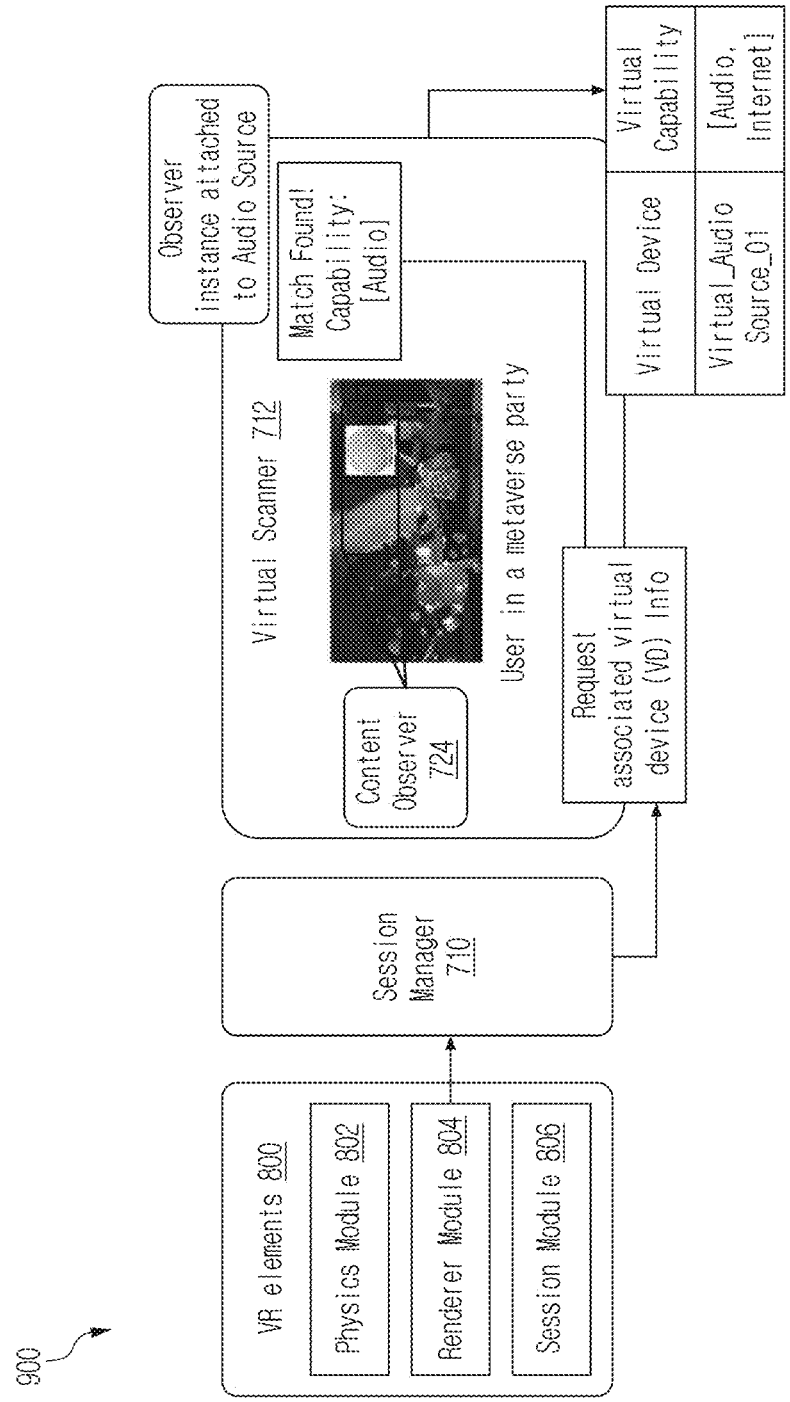
FIG. 9 is a block diagram illustrating an example functional representation of virtual scanning in the metaverse session using the virtual scanner, according to one or more embodiments.

FIG. 9 is a block diagram illustrating an example functional representation 900 of virtual scanning in the metaverse session using the virtual scanner 712, according to one or more embodiments. As illustrated in FIG. 9, the virtual scanner 712 interfaces with the renderer module 804 of the VR elements 800 through the session manager 710 and scans the rendered metaverse environment. The virtual scanner 712 identifies at least one possible virtual device content such as audio, video, document, device based configuration, based on the scan of the metaverse environment. The virtual scanner 712 attaches a listening mechanism to the identified virtual device content using the content observer 724.

For example, the virtual scanner 712 may request the session manager 710 for information related to the virtual device (VD) and obtain a relevant match with a virtual device as a virtual audio source and a virtual capability as audio and internet based on the information received from the session manager 710. The virtual scanner 712 then attaches an observer instance to the audio source using the content observer 724. Further, the virtual scanner 712 determines the context of the virtual device content based on the listening mechanism.

In one or more embodiments herein, the interest detection module 714 may be configured for deriving at least one user interest towards the virtual device content using at least one multimodal user input within the virtual session. Examples of the user interest may be, but not limited to, at least one avatar action of the user such as explicit statements and implicit remarks through voice, body language/gesture, etc.

In one or more embodiments herein, the interest detection module 714 may utilize a multimodal interest engine 726 for deriving the user interests. The multimodal interest engine 726 further comprises a multimodal input module 738 and a generic interest detection engine 740.

The multimodal input module 738 may be configured for listening to or detecting the avatar actions of the user through at least one multimodal user input. The generic interest detection engine 740 utilizes an artificial intelligence (AI) model which may be configured for deriving a correlation between at least one avatar action and a plurality of generalized interests of the user. The generic interest detection engine 740 may differentiate between objects in the real world and the virtual world based on the correlation to understand an intent of the user. The generic interest detection engine 740 may further derive the user interest based on the intent of the user.

In one or more embodiments herein, the interest detection module 714 comprises a data collector 728 for collecting metadata information of the derived at least one user interest.

Figure 10:
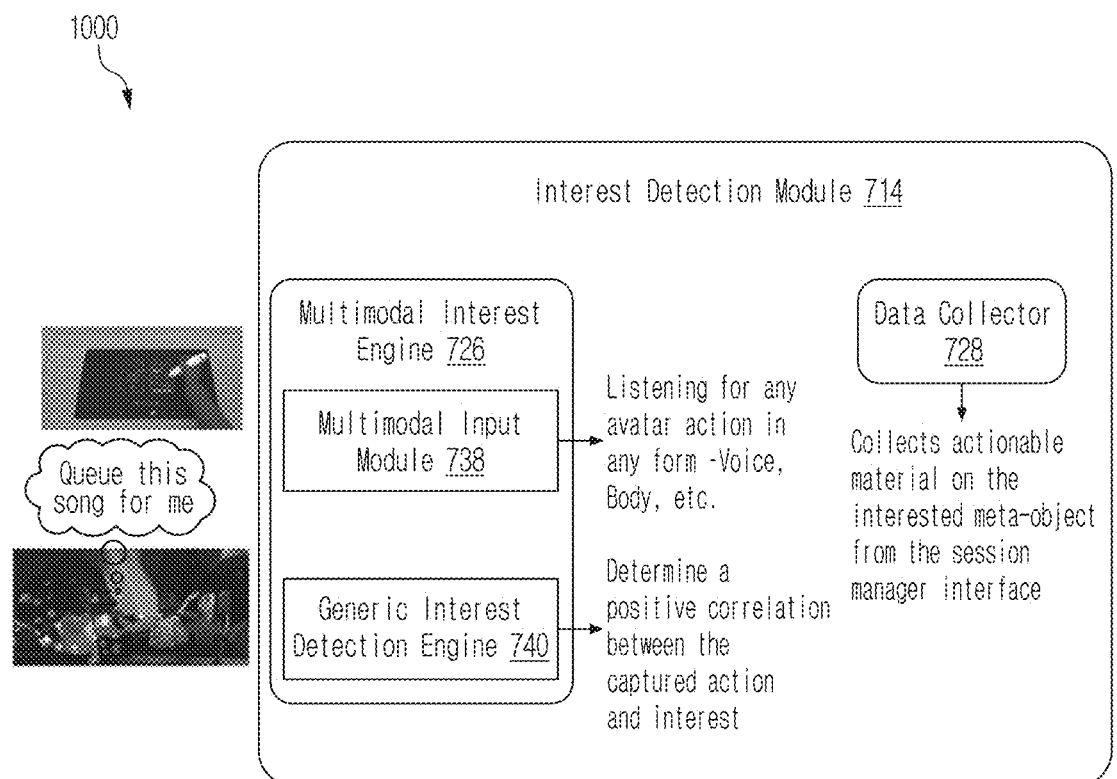
FIG. 10 is a diagram illustrating an example functional representation of deriving the user interest in the metaverse session using the interest detection module, according to one or more embodiments.

FIG. 10 is a diagram illustrating an example functional representation 1000 of deriving the user interest in the metaverse session using the interest detection module 714.

The multimodal input module 738 of the interest detection module 714 may be used to detect if the user is interested in transferring the virtual contents to the real world. The user interest may be expressed in any form through explicit statements, implicit remarks, body language, gestures, actions, etc. The multimodal input module 738 may listen for any avatar action in any form such as through voice, body language, and so on. For example, the user may verbally say "Queue this song for me".

The generic interest detection engine 740 is an AI model that generalizes different ways in which a VR avatar may express a corresponding interest. The generic interest detection engine 740 captures interest across various modes of expression to understand an intent of the user. The interest may be based on a selection of an item to be displayed or played in the virtual environment, or the context of an utterance by a user.

The data collector 728 collects actionable material on the interested meta-object from the session manager interface. The actionable materials are capabilities of user interest devices, where capabilities may be the actions that may be performed on the device. For example, a user may play and pause songs on a speaker, or the user may control brightness, saturation, color and ambience of a light etc.

In one or more embodiments herein, the bridge module 704 acts as an interface between the plurality of virtual modules 702 and the plurality of real modules 706. The bridge module 704 comprises a content stream database 716. The content stream database 716 collects the metadata information from the data collector 728 of the virtual session and stores the metadata information.

The real modules 706 comprise a scenario analyzer 718, a capability abstractor 720, and an intelligent device identification engine 722. In one or more embodiments herein, the scenario analyzer 718 may be configured for analyzing at least one user activity in the real world for finding at least one real-world context relevant to the derived user interest, as obtained from the interest detection module 714.

Figure 11:
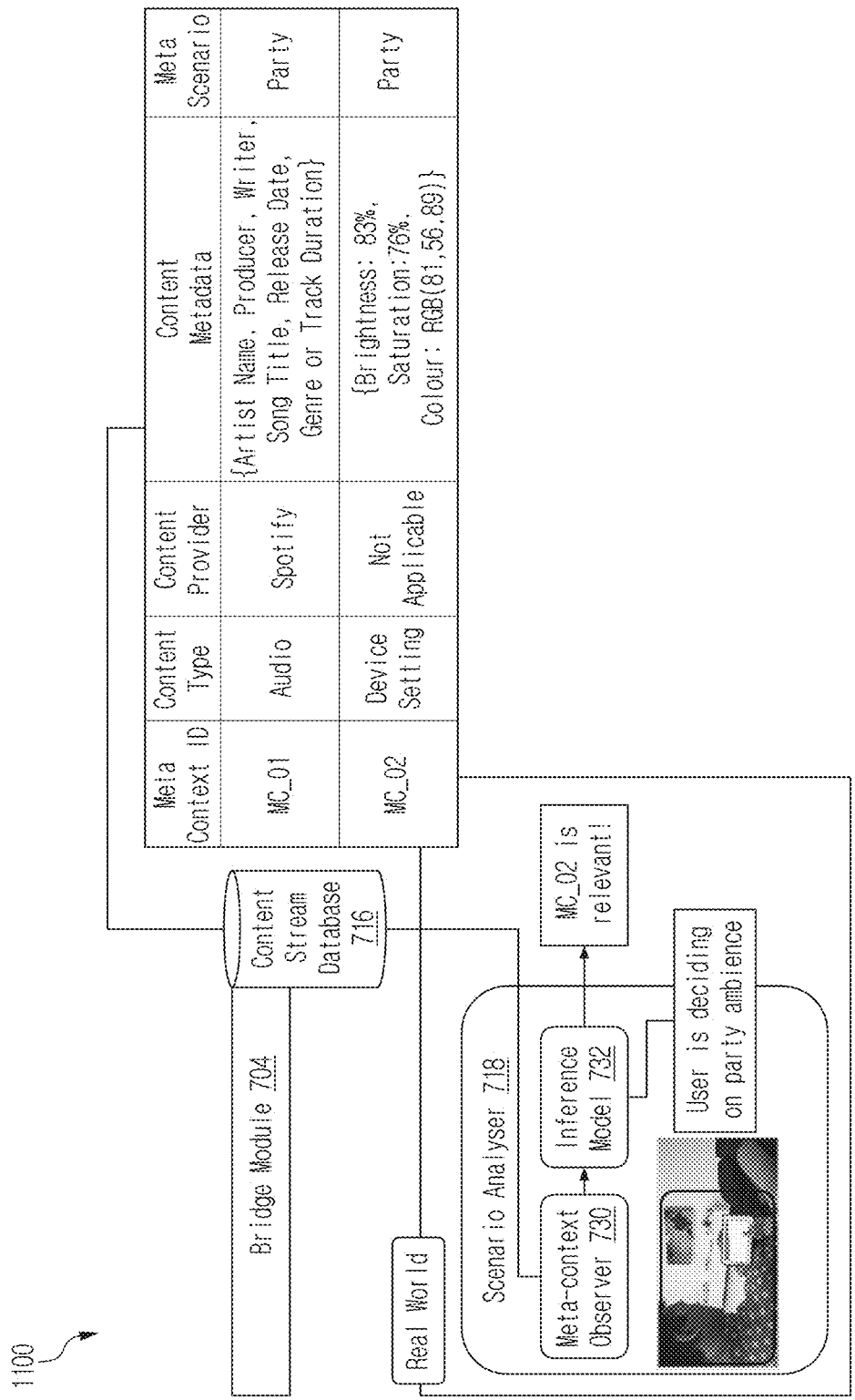
FIG. 11 is a diagram illustrating an example functional representation of analyzing a user activity in the real world using the scenario analyser, according to one or more embodiments.

FIG. 11 is a diagram illustrating an example functional representation 1100 of analyzing at least one user activity in the real world using the scenario analyzer 718, according to one or more embodiments. The scenario analyzer 718 may be in communication with the content stream database 716 of the bridge module 704 and the real world. For each metadata information of the derived user interest stored in the content stream database 716, the scenario analyzer 718 observes user activity in the real world for a pre-defined period of time using the meta-context observer 730 to check when the metadata information is useful and relevant. The scenario analyzer 718 utilizes the inference model 732 to find and determine the real-world context which is relevant to the derived user interest. For example, as depicted, as a user schedules a party in the real world, the inference model 732 finds meta context ID MC 02 with content type device setting as relevant from the metadata information, which is available in the content stream database 716.

In one or more embodiments herein, the capability abstractor 720 may be configured for correlating the derived user interest with at least one content capability of a plurality of real world devices 708 of the user. The capability abstractor 720 breaks down the plurality of real world devices 708 into capability skeletons for extracting the content capability of each real world device 708, on finding the relevant real-world context. The content capabilities of the real world device 708 may be, but not limited to an audio, video, internet, brightness, and saturation.

Figure 12:
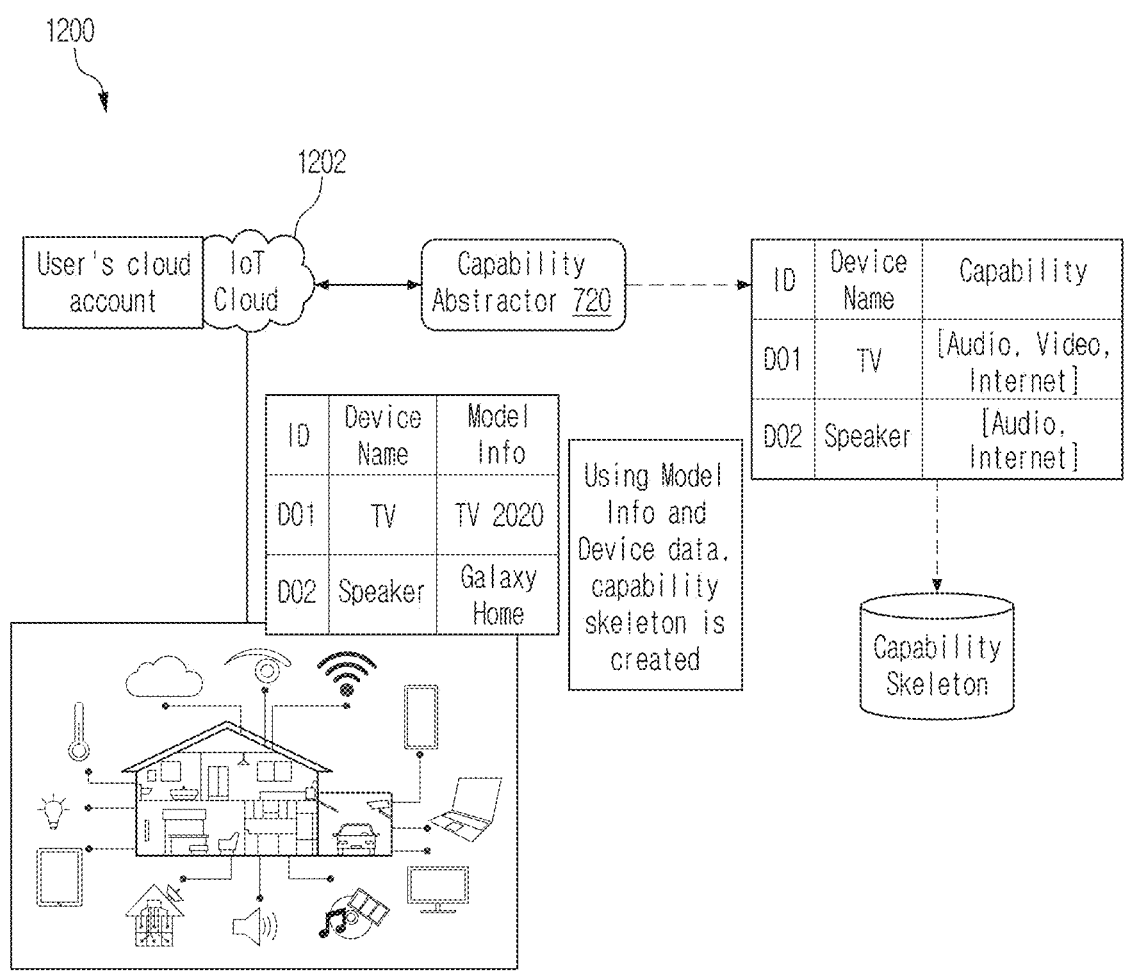
FIG. 12 is a diagram illustrating an example functional representation of breaking down the real world devices into capability skeletons in the real world using the capability abstractor, according to one or more embodiments.

FIG. 12 is a diagram illustrating an example functional representation 1200 of breaking down the real world devices 708 into capability skeletons in the real world using the capability abstractor 720, according to one or more embodiments. The capability abstractor 720 obtains each real world device 708 object that belongs to the user from the user's cloud account via the IoT cloud 1202. The capability abstractor 720 breaks down the real world device 708 object into content capability skeletons and extracts various content capabilities of the real world devices 708. The capability abstractor 720 utilizes model info and device data of each real world device 708 and creates the capability skeleton. For example, if a TV has the capability to play audio, video and some content over the internet, then the capability skeleton of the TV becomes as follows: [Audio, Video, and Internet].

In one or more embodiments herein, the intelligent device identification engine 722 may be configured for recommending at least one real world device 708 to the user, wherein the context of the virtual device content may be transferred to the recommended at least one real world device 708, based on a correlation of the user interest with the content capability. The intelligent device identification engine 722 identifies the best possible real world device present in the user's real world environment based on the correlation of the content capabilities of the real world devices 708 of the user. The intelligent device identification engine 722 finds the best possible real world device from the real world devices 708 which is in user proximity, on breaking down the plurality of real world devices 708 into the capability skeletons.

The intelligent device identification engine 722 further comprises a software compatibility model 734 and a device compatibility model 736. In one or more embodiments herein, the software compatibility model 734 may be configured for performing deep systemic checks to verify whether the software, required to display the context from the virtual session or metaverse session, is present in the recommended real world device 708. In one or more embodiments herein, the device compatibility model 736 may be configured for analyzing the capability skeletons and the stored metadata information of the user interest using an AI model. Based on this analysis, the device compatibility model 736 identifies and recommends the real world device 708 from the proximity real world devices 708 for transferring the context of the virtual device content.

Figure 13:
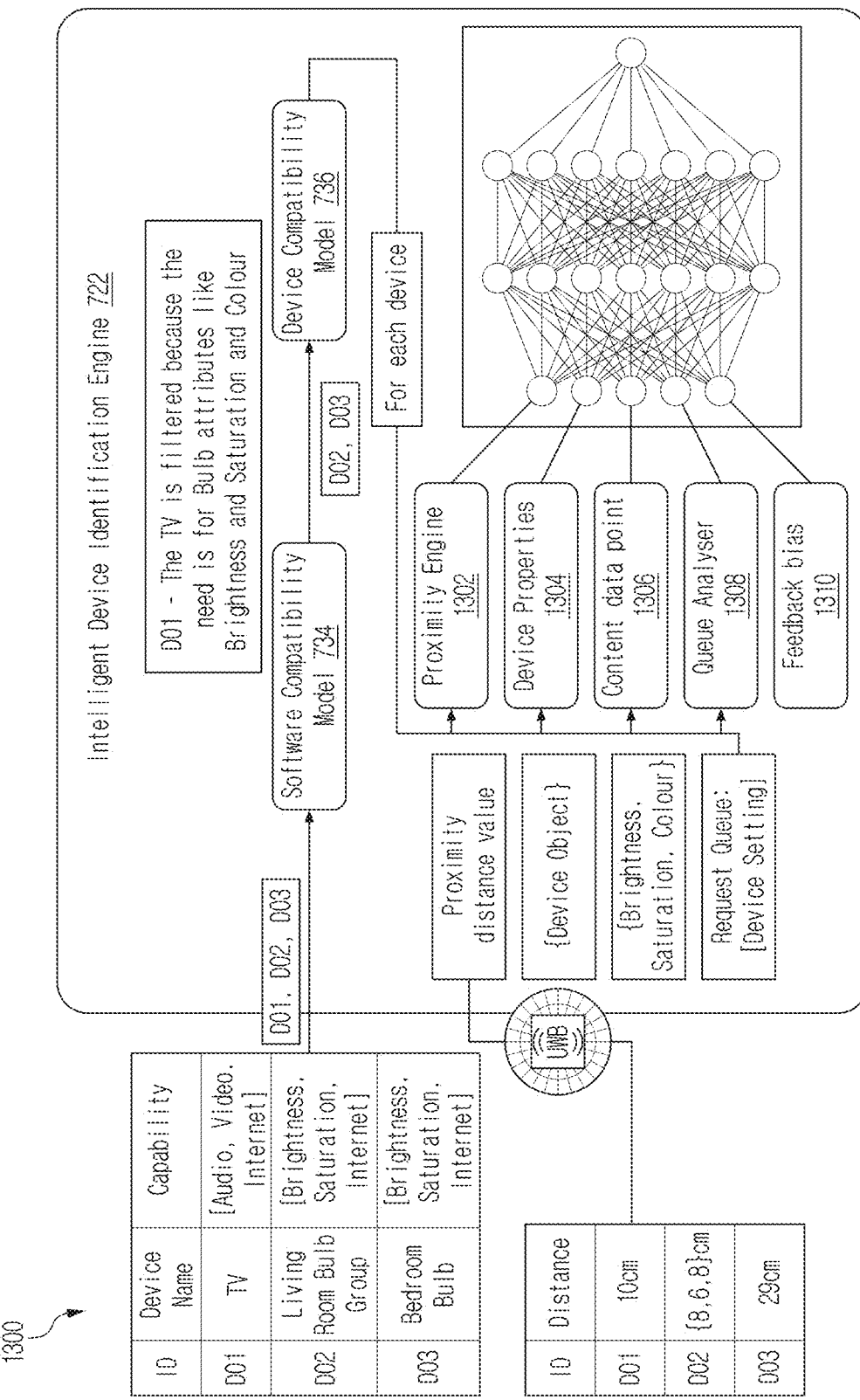
FIG. 13 is a diagram illustrating an example functional representation of identifying and recommending a real world device to the user using the intelligent device identification engine, according to one or more embodiments.

FIG. 13 is a diagram illustrating an example functional representation 1300 of identifying and recommending at least one real world device 708 to the user using the intelligent device identification engine 722, according to one or more embodiments. As illustrated in FIG. 13, the software compatibility model 734 may filter out software incompatible devices. For example, from the device ID's D01, D02, and D03, the device D01-TV is filtered out because this device does not meet the requirements for bulb attributes like brightness, saturation and color.

In one or more examples, the device compatibility model 736 is an AI model that outputs the probability of each of the user's cloud devices for being the best possible real world device 708 for displaying the transferred content. In one or more embodiments herein, the device compatibility model 736 is an unsupervised model.

For example, for each real world device 708, data such as proximity engine 1302, device properties 1304, content data point 1306, queue analyzer 1308, and feedback bias 1310, act as input nodes to the device compatibility model 736. The proximity engine 1302 uses ultra-wideband (UWB) technology to output the distance of the real world devices 708 from the user.

The device properties 1304 field comprises of device information such as device_id, device_type, etc. This information helps in establishing a correlation in a user's choice of the real world device 708 and content transferred. The content data point 1306 field comprises of metadata of the transferred content. The queue analyzer 1308 analyzes the content types in the queue of transfer requests, as the best device needs to be found for all the transfers that happen during a metaverse session. The best device is the device on which the user may access the data with minimal effort. The feedback bias 1310 node may understand the user's choice over a period of time. This feedback effectively creates a personalized model with an understanding of user's preference of real world devices 708 for a specific type of transferred content. Thus, the device compatibility model 736 analyzes the data nodes and recommends the best possible real world device 708 for transferring the context of the virtual device content.

FIG. 7 shows example modules of the processor 202. However, as understood by one of ordinary skill in the art, the embodiments are not limited to this configuration. In other embodiments, the processor 202 may include less or more number of modules. Further, the labels or names of the modules are used only for illustrative purpose and does not limit the scope of the embodiments. One or more modules may be combined together to perform a same or substantially similar function in the processor 202.

Figure 14:
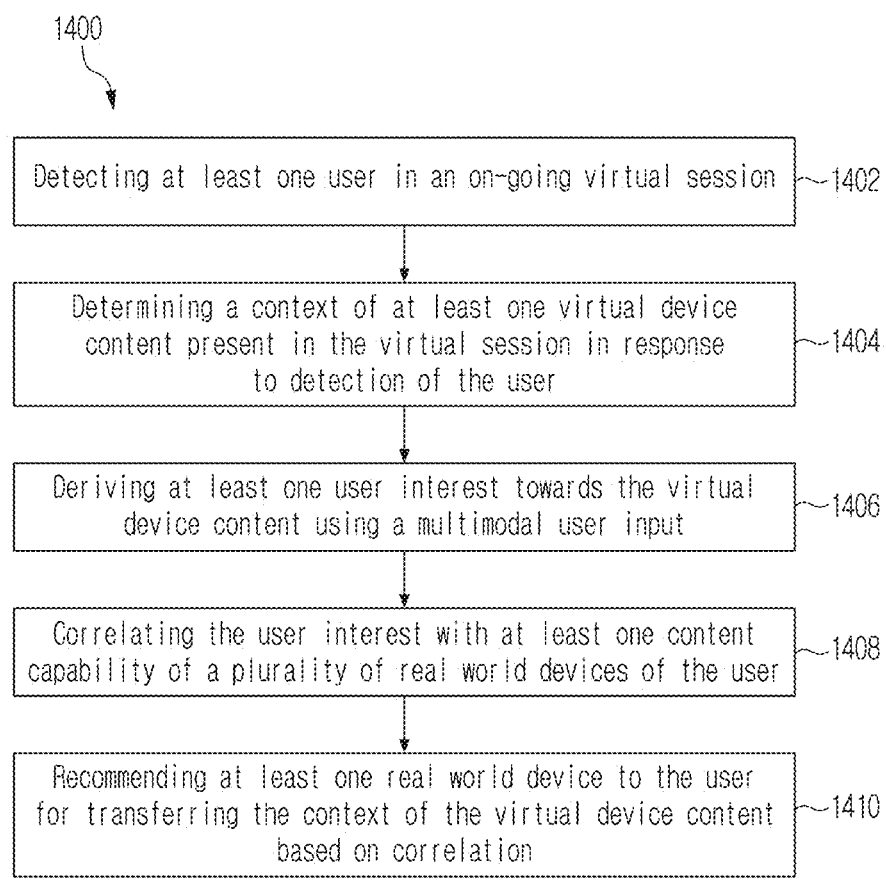
FIG. 14 is a flowchart illustrating a method for enabling the context transfer from the virtual session to the real world, according to one or more embodiments.

FIG. 14 is a flow chart illustrating a method 1400 for enabling context transfer from the virtual session to the real world, according to one or more embodiments. The method 1400 begins with detecting, by the session manager 710 of the electronic device 200, at least one user in an on-going virtual session, as illustrated in operation 1402. Subsequently, the method 1400 discloses determining, by the virtual scanner 712 of the electronic device 200, a context of at least one virtual device content present in the virtual session, in response to detecting the user, as illustrated in operation 1404. The virtual device content is detected by scanning the virtual environment once the user is detected. Thereafter, the method 1400 discloses deriving, by the interest detection module 714 of the electronic device 200, at least one user interest towards the virtual device content, as illustrated in operation 1406. The user interest is derived using the multimodal user input within the virtual session. The method 1400 further discloses correlating, by the capability abstractor 720 of the electronic device 200, the user interest with at least one content capability of a plurality of real world devices 708 of the user, as illustrated in operation 1408. The method 1400 further discloses recommending, by the intelligent device identification engine 722 of the electronic device 200, at least one real world device 708 to the user for transferring the context of the virtual device content based on correlation, as illustrated in operation 1410. The real world device 708 may be a real world device which is detected and recommended based on the correlation of the user interest with the content capabilities of the real world devices. The various actions in method 1400 may be performed in the order presented, in a different order or simultaneously. Further, in some embodiments, some actions listed in FIG. 14 may be omitted.

Figure 15:
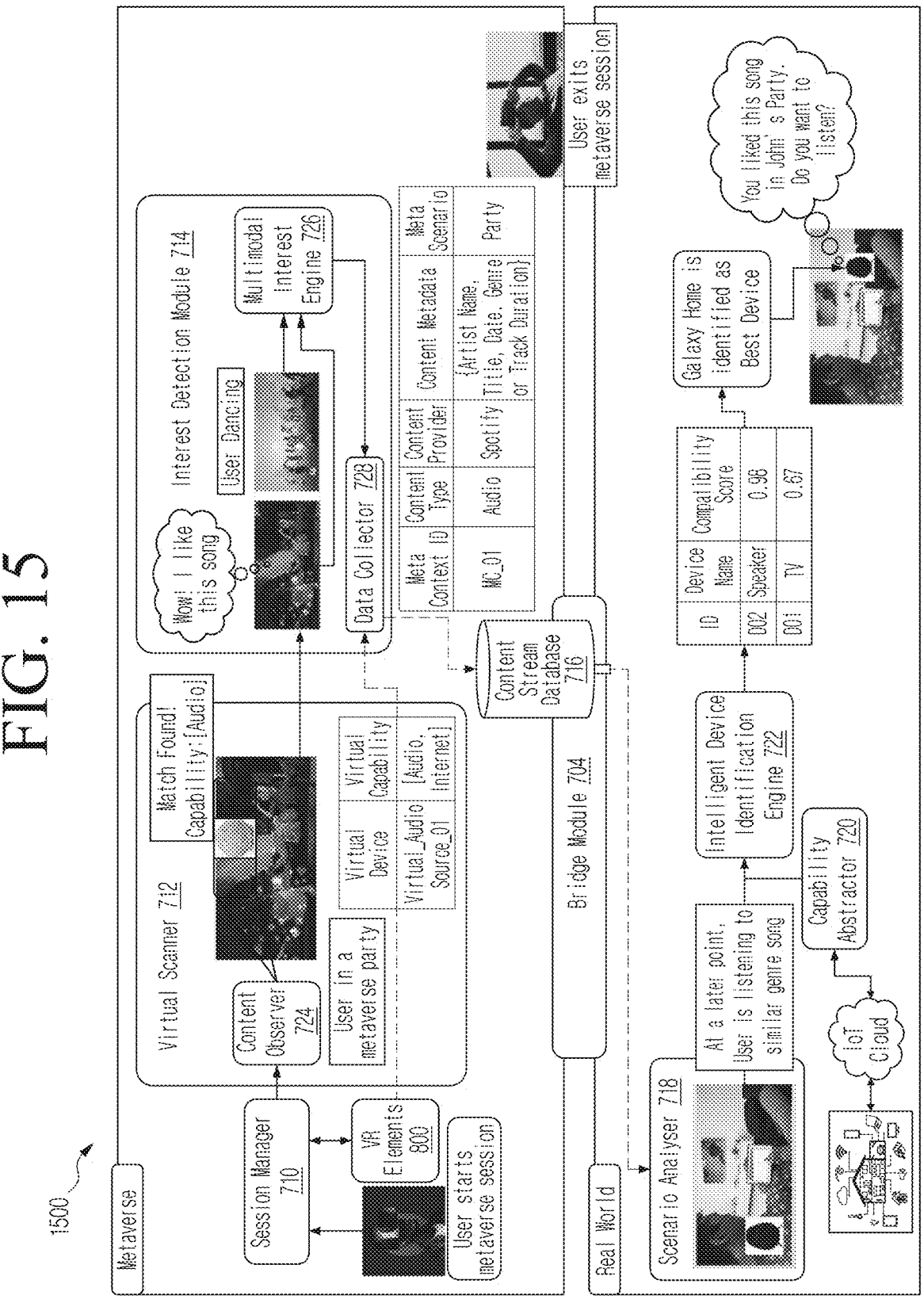
FIG. 15 is a diagram illustrating an example use case where a user expresses interest towards a song in a metaverse session of a part, according to one or more embodiments.

FIG. 15 is a diagram illustrating an example use case 1500 where user expresses interest towards a song in a metaverse session of a party. As illustrated, as the user starts the metaverse session, the session manager 710 detects the user in the metaverse party. The user may listen to a particular song or may express interest in a song. The virtual scanner 712 scans the metaverse environment and identifies audio as the context from a virtual device content using the content observer 724. The interest detection module 714 derives the user interest as "Wow! I like this song" using the multimodal interest engine 726, and the user interest is stored in the data collector 728. Once the user exits the metaverse session, the scenario analyzer 718 finds the real-world context relevant to the user interest. If the user listens to similar genre song in the real world at a later point, the capability abstractor 720 correlates the user interest with at least one content capability of the plurality of real world devices 708 through the IoT cloud 1202. The intelligent device identification engine 722 recommends best possible device to the user such as Galaxy Home based on proximity, capability and usage patterns at the right time and suggests as "You liked this song in John's Party. Do you want to listen?". Based on the user response, the song is transferred to the recommended device and played through it.

Figure 16A:
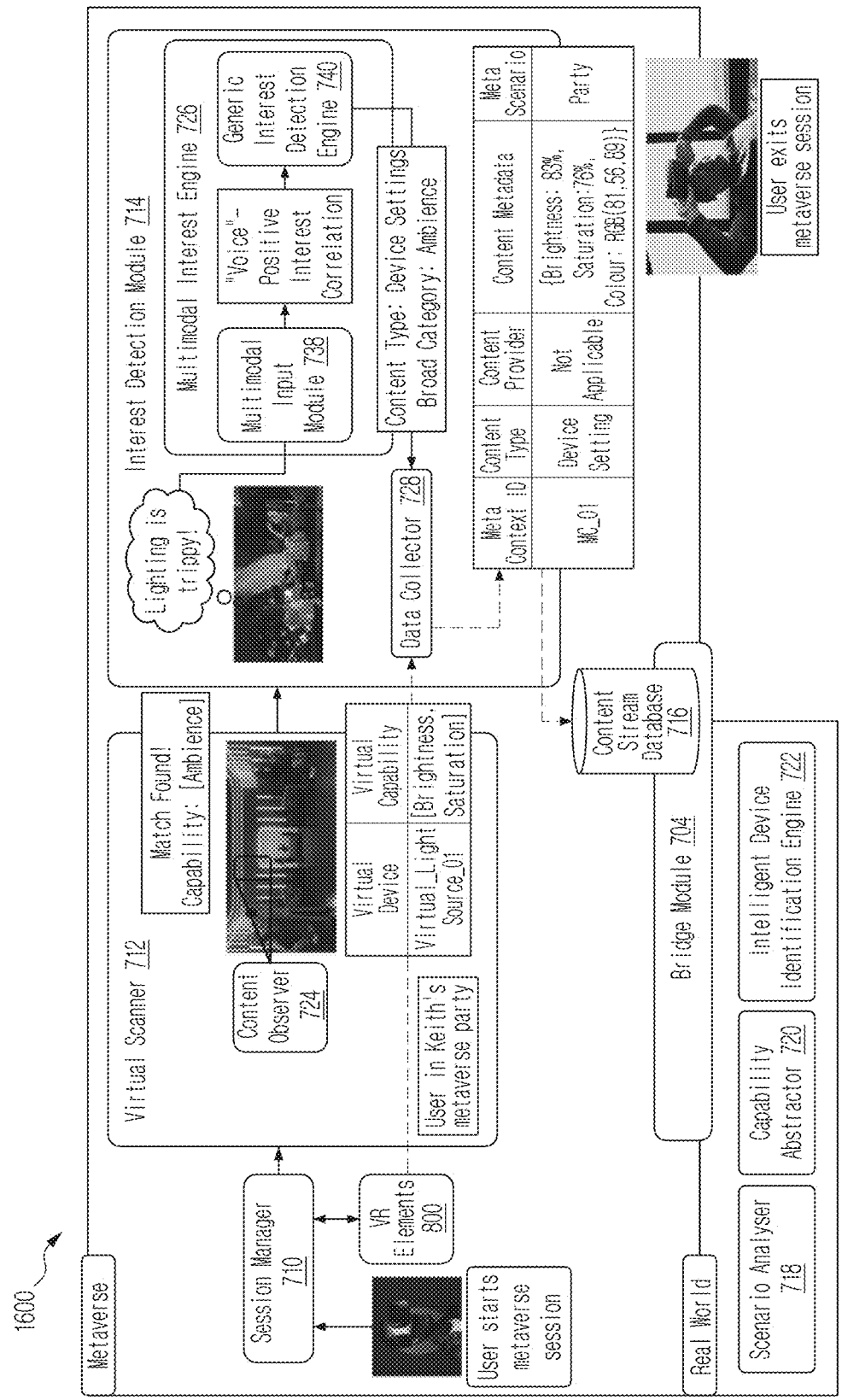
FIGS. 16A and 16B are diagrams illustrating an example use case where a user expresses interest towards ambience of a party in a metaverse session, according to one or more embodiments.
Figure 16B:
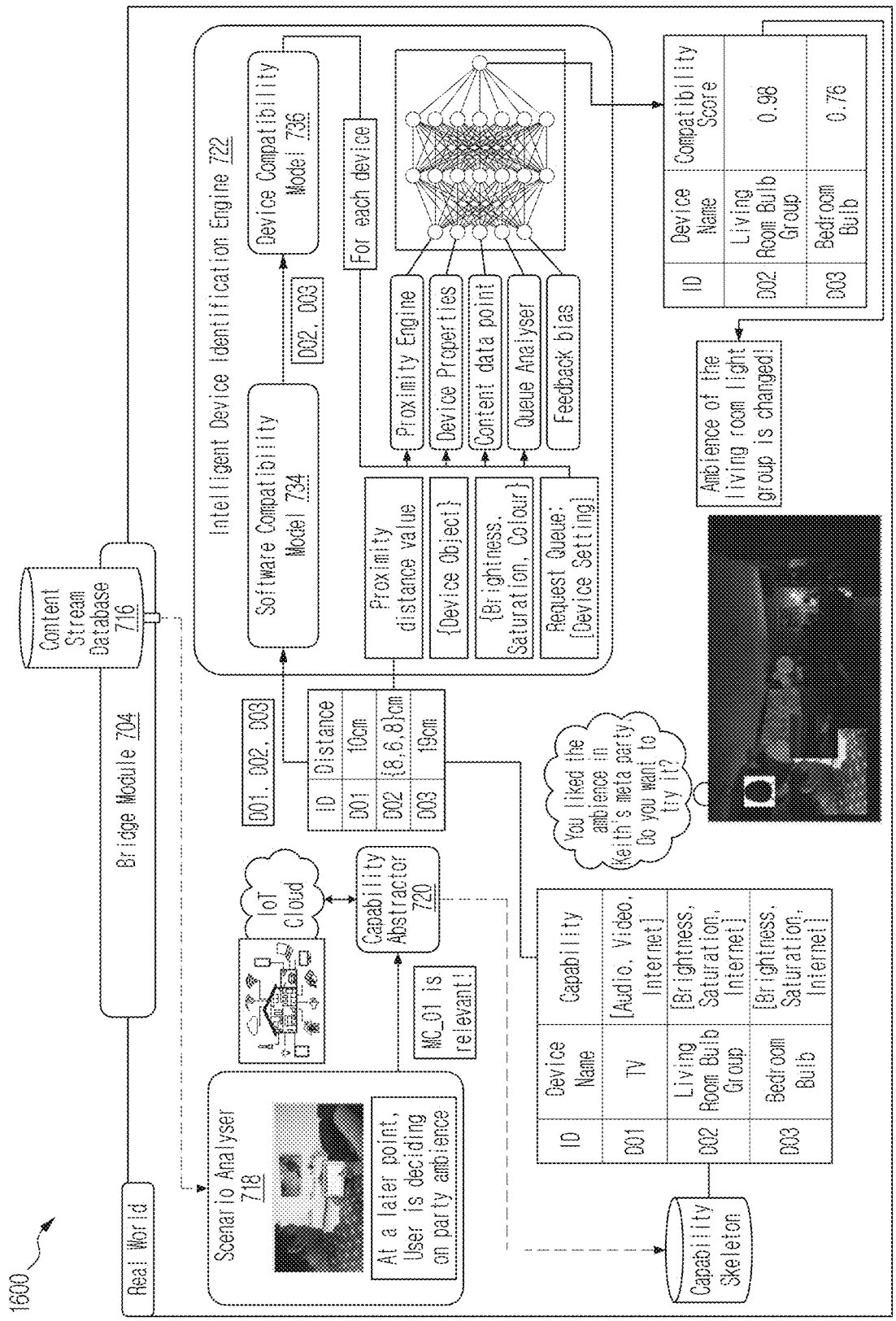

FIGS. 16A and 16B are diagrams illustrating an example use case 1600 where user expresses interest towards ambience of a party in a metaverse session. As illustrated in FIGS. 16A and 16B, as the user starts the metaverse session, the session manager 710 detects the user in the metaverse party. The user likes the ambience of the party and may express interest. The virtual scanner 712 scans the metaverse environment and identifies ambience as the context from a virtual device content using the content observer 724. The interest detection module 714 listens the avatar action as "Lighting is trippy!" using the multimodal input module 738 of the multimodal interest engine 726. The generic interest detection engine 740 of the multimodal interest engine 726 implements voice-positive interest correlation and derives user interest. The user interest along with content type as device settings and category as ambience are stored in the data collector 728.

Once the user exits the metaverse session, the scenario analyzer 718 finds the real-world context relevant to the user interest as MC 01 as meta context ID, where content metadata may comprise brightness, saturation and color. For example, when a user schedules a party in future, the capability abstractor 720 correlates the user interest with at least one content capability of the plurality of real world devices 708 through the IoT cloud 1202. The intelligent device identification engine 722 checks the software compatibility 734 and device compatibility 736 and recommends best possible device to the user through a speaker, based on proximity, capability and usage patterns at the right time and suggests as "You liked the ambience in Keith's meta party. Do you want to try it?". Based on the user response, the ambience is transferred to the best possible devices in the User's living room.

Figure 17A:
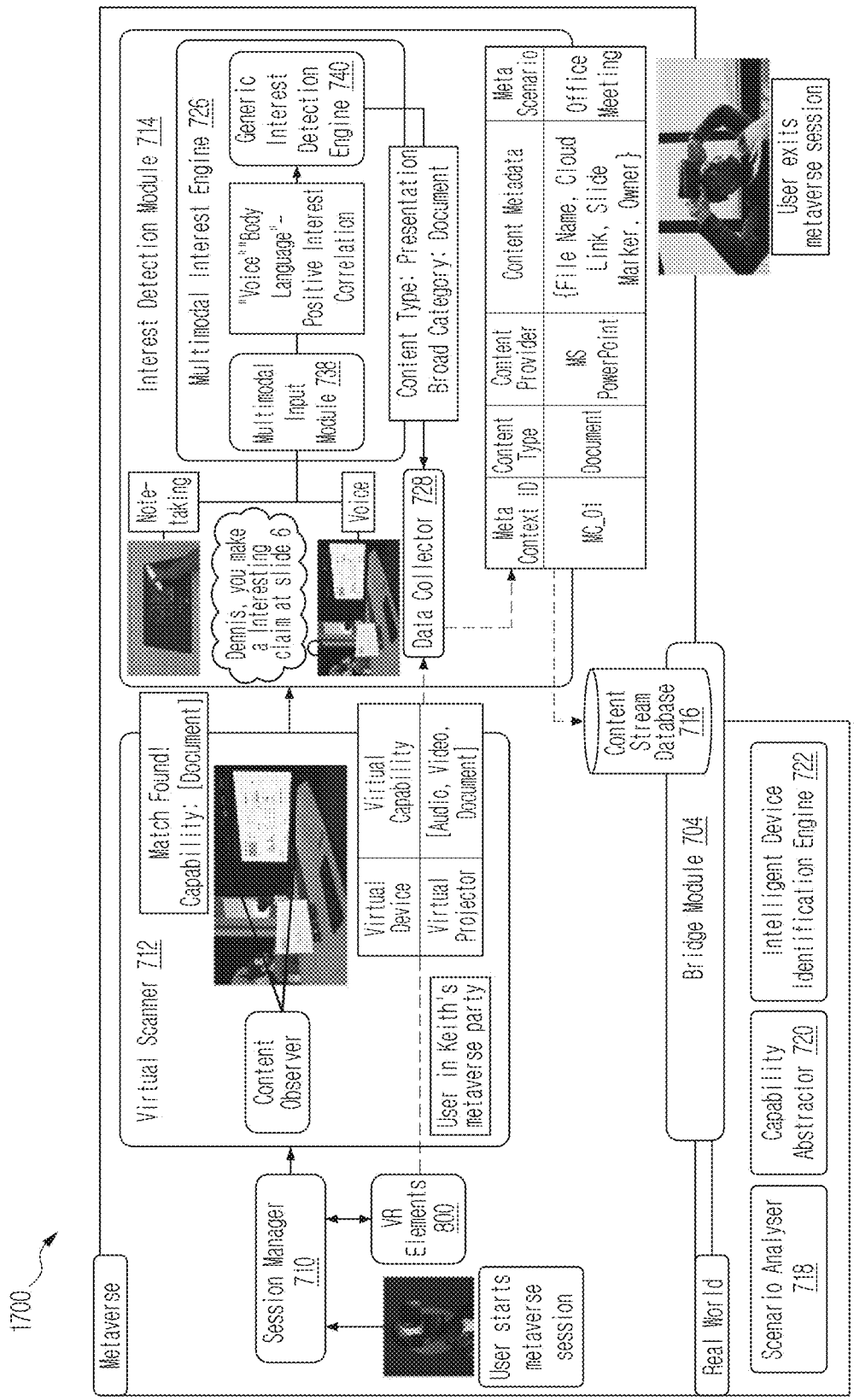
FIGS. 17A and 17B are diagrams illustrating an example use case where a user is in a metaverse office meeting, according to one or more embodiments.
Figure 17B:
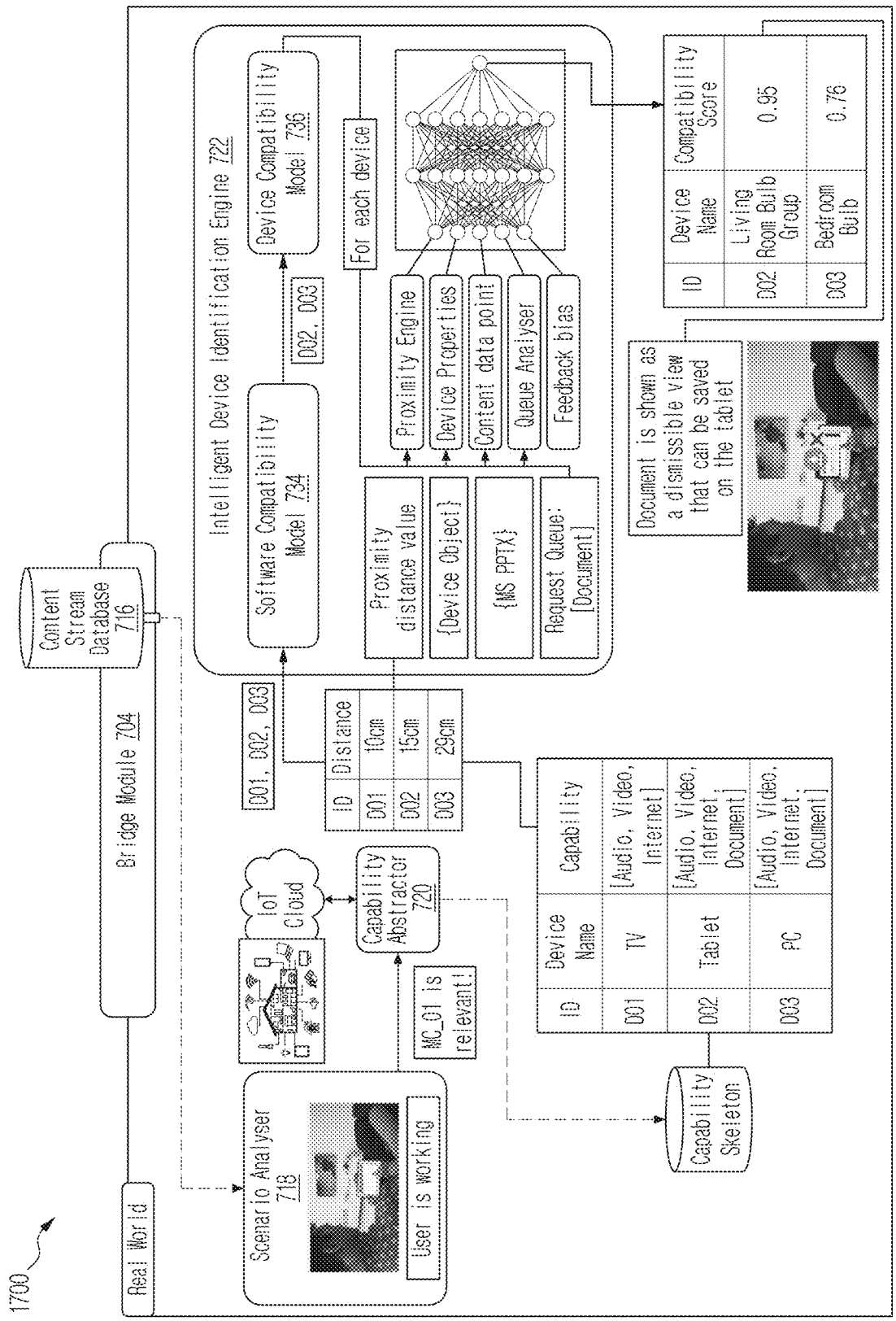

FIGS. 17A and 17B are diagrams illustrating an example use case 1700 where user is in a metaverse office meeting. As depicted, as the user starts the metaverse session, the session manager 710 detects the user in the metaverse meeting. The user is working in the metaverse session. The virtual scanner 712 scans the metaverse environment and identifies document as the context from a virtual device content using the content observer 724. The interest detection module 714 identifies the avatar action as "Dennis, you make an Interesting claim at slide 6" using the multimodal input module 738 through inputs of note taken by the user and voice given to the multimodal interest engine 726. The generic interest detection engine 740 of the multimodal interest engine 726 implements voice and body language-positive interest correlation and derives the user interest. The user interest along with content type as presentation and broad category as document are stored in the data collector 728.

Once the user exits the metaverse session, the scenario analyzer 718 finds the real-world context relevant to the user interest as MC 01 as meta context ID, where content metadata may comprise file name, cloud link, slide marker, and owner. If the user is working in real world, the capability abstractor 720 correlates the user interest with at least one content capability of the plurality of real world devices 708 through the IoT cloud 1202. The intelligent device identification engine 722 checks the software compatibility 734 and device compatibility 736 and recommends best possible device to the user through a display, based on proximity, capability and usage patterns at the right time. Thus, the document is shown as a dismissible view that may be saved on the best possible device such as tablet or PC or laptop.

Figure 18A:
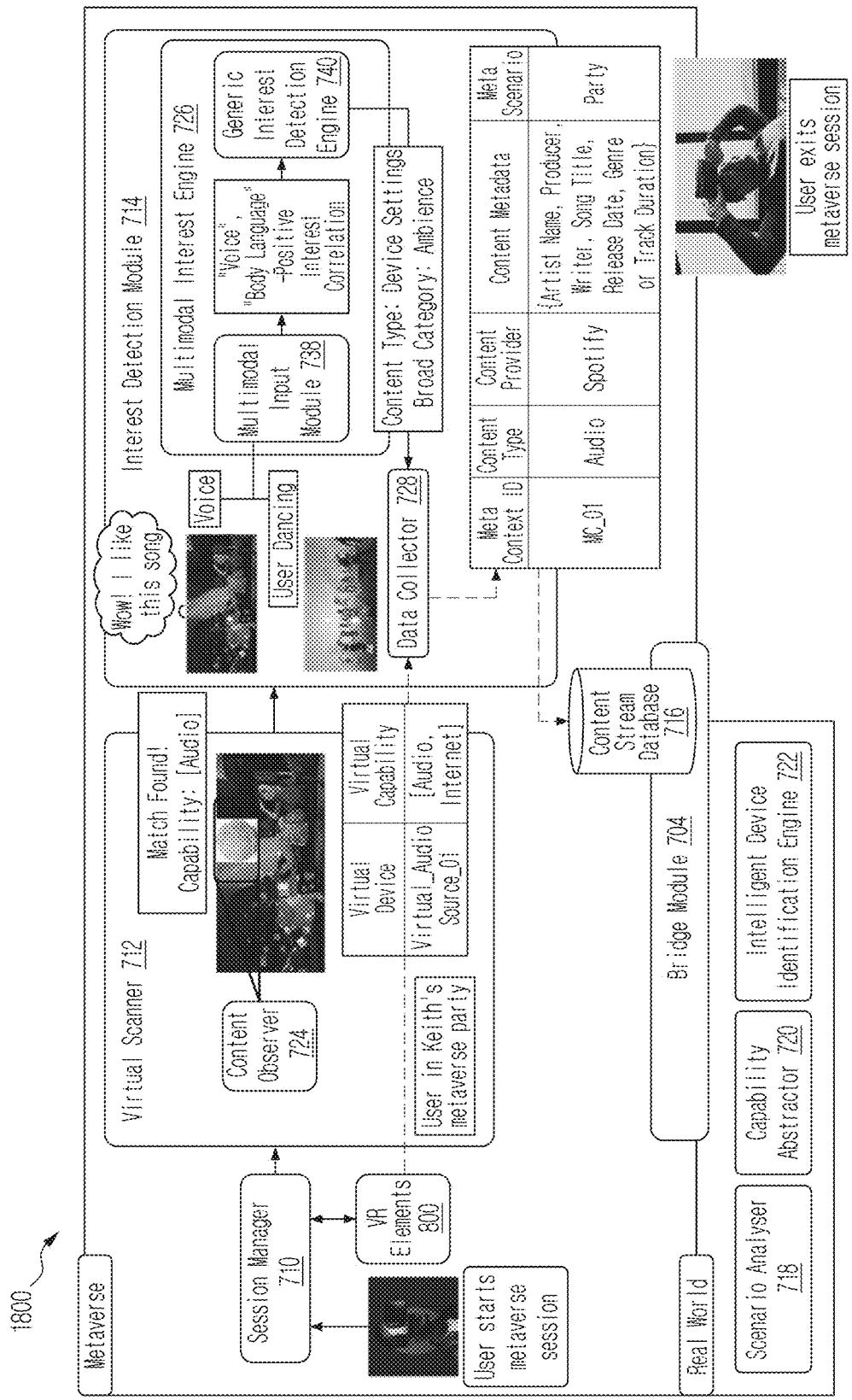
FIGS. 18A, 18B and 18C are diagrams illustrating an example use case where a user likes a video and song in the metaverse, according to one or more embodiments.
Figure 18B:
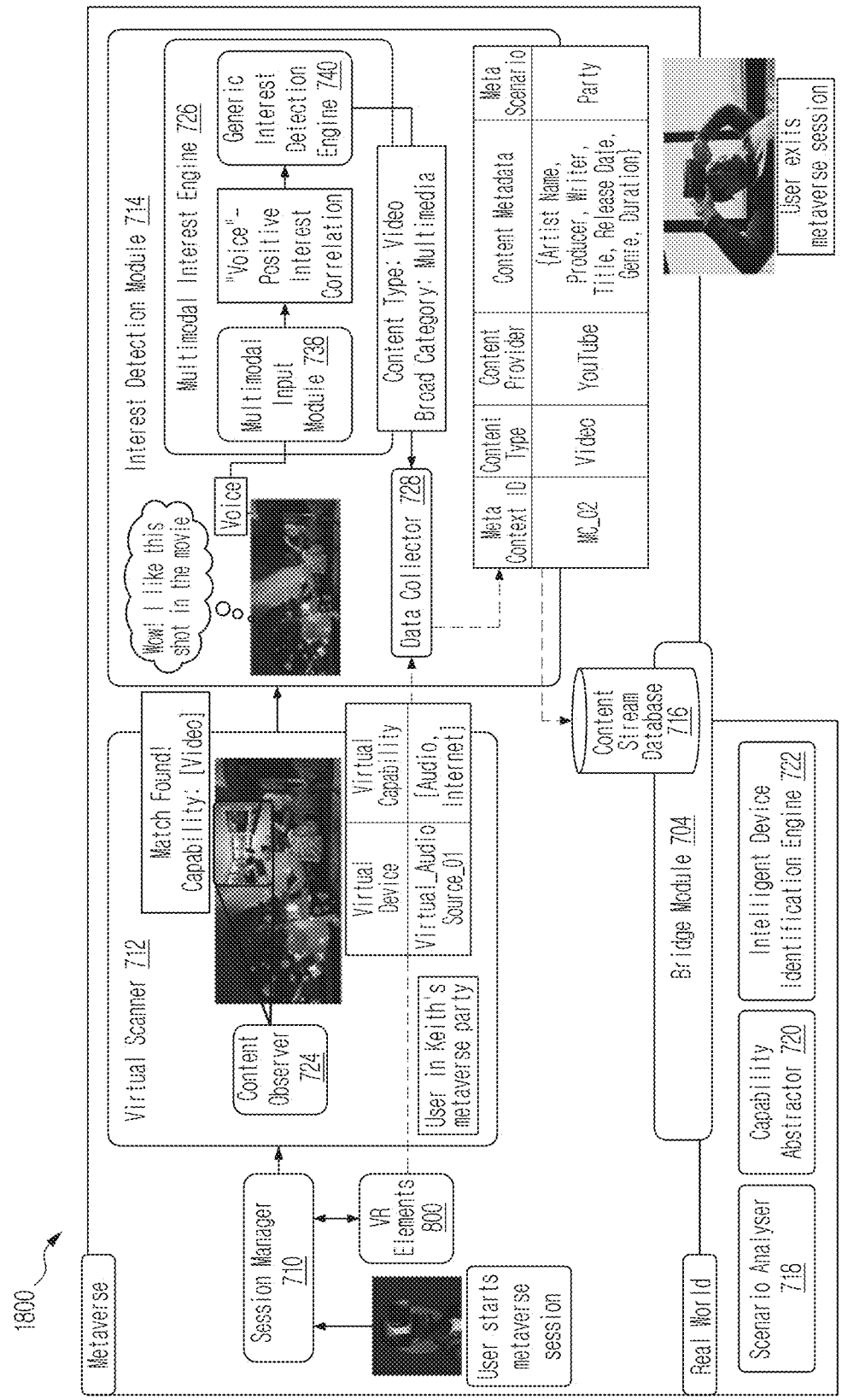
Figure 18C:
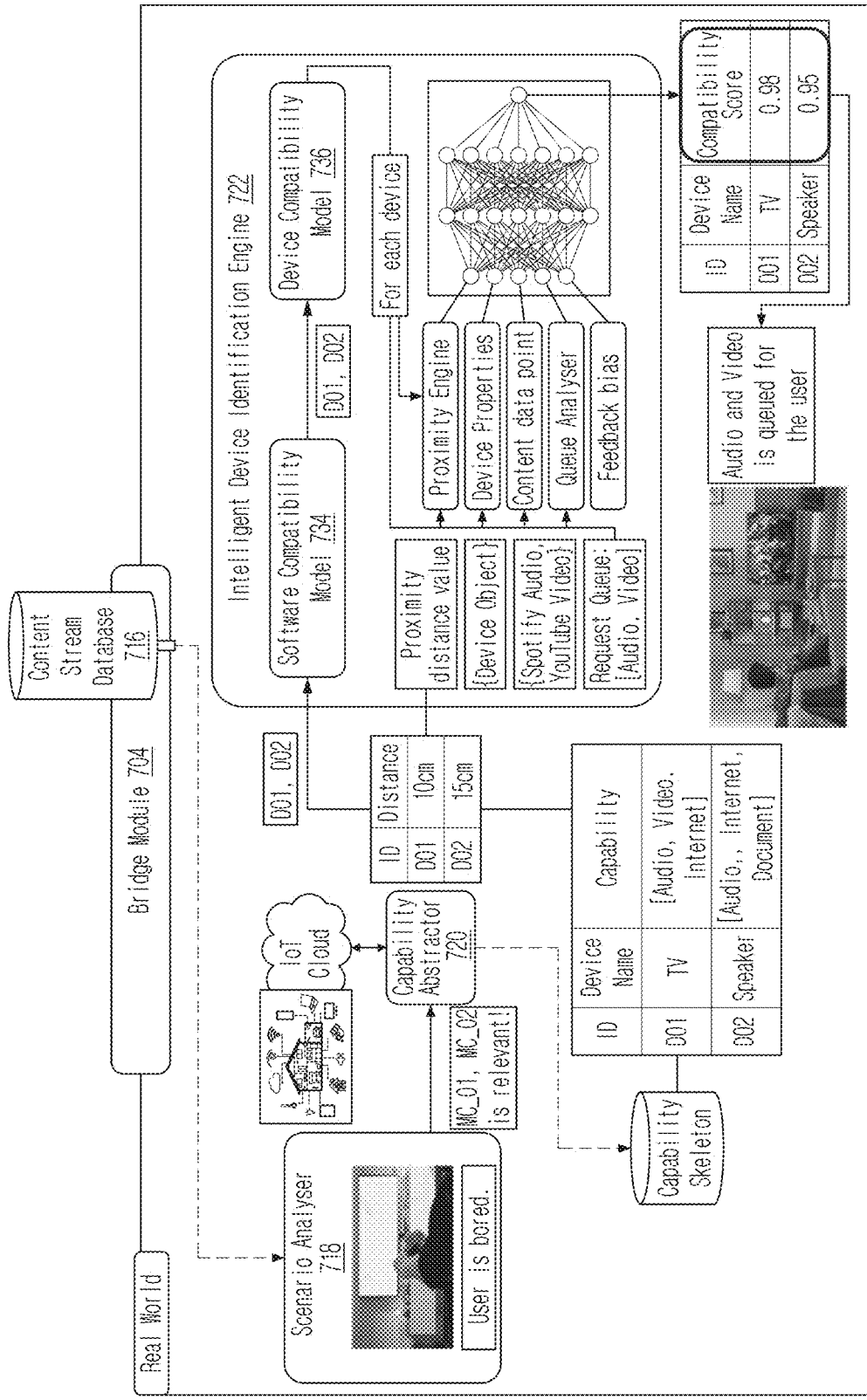

FIGS. 18A, 18B and 18C are diagrams illustrating an example use case 1800 where user likes a video and song in the metaverse.

As depicted in the FIG. 18A, as the user starts the metaverse session, the session manager 710 detects the user in the metaverse party. The virtual scanner 712 scans the metaverse environment and identifies audio as the context from a virtual device content using the content observer 724. The interest detection module 714 identifies the avatar action as "Wow! I like this song" using the multimodal input module 738 through inputs of voice and user dancing given to the multimodal interest engine 726. The generic interest detection engine 740 of the multimodal interest engine 726 implements voice and body language-positive interest correlation and derives the user interest. The user interest along with content type as audio and broad category as multimedia is stored in the data collector 728.

Simultaneously, as illustrated in the FIG. 18B, the virtual scanner 712 scans the metaverse environment and identifies video as the context from a virtual device content using the content observer 724. The interest detection module 714 identifies the avatar action as "Wow! I like this shot in the movie" using the multimodal input module 738 through input of voice given to the multimodal interest engine 726. The generic interest detection engine 740 of the multimodal interest engine 726 implements voice positive interest correlation and derives the user interest. The user interest along with content type as video and broad category as multimedia is stored in the data collector 728.

Once the user exits the metaverse session, the scenario analyser 718 finds the real-world context relevant to the user interest as MC 01 and MC 02 as meta context ID, where content metadata may comprise artist name, producer, writer, title, song title, release date, genre, duration or track duration. For example, if the user browses a content in the real world device such as a television or phone, the capability abstractor 720 correlates the user interest with at least one content capability of the plurality of real world devices 708 through the IoT cloud 1202. The intelligent device identification engine 722 checks the software compatibility 734 and device compatibility 736 and recommends best possible real world device to the user through a display, based on proximity, capability and usage patterns at the right time. Thus, content such as the audio and video relevant to the browsed content is queued and displayed for the user, based on the user interest, as a dismissible view on the best possible device such as TV and speaker.

The embodiments disclosed herein may be implemented through at least one software program running on at least one hardware device. The modules shown in FIG. 7 include blocks which may be at least one of a hardware device, or a combination of hardware device and software module.

The embodiments disclosed herein describe a device and methods for transferring a user preferred virtual context to a best possible real world device after terminating the virtual session. Therefore, it is understood that the scope of the protection is extended to such a program and in addition to a computer readable means having a message therein, such computer readable storage means contain program code means for implementation of one or more operations of the method, when the program runs on a server or mobile device or any suitable programmable device. The method is implemented in at least one embodiment through or together with a software program written in e.g. Very high speed integrated circuit Hardware Description Language (VHDL) another programming language, or implemented by one or more VHDL or several software modules being executed on at least one hardware device. The hardware device may be any kind of portable device that may be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the embodiments may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments and examples disclosed herein may be practiced with modification within the spirit and scope of the embodiments as described herein.

What is claimed is:

1. A method of controlling an electronic device for enabling a context transfer from a virtual session to an environment external to the virtual session, the method comprising:
    detecting at least one user in the virtual session;
    based on detecting the at least one user, obtaining a context of at least one virtual device content present in the virtual session;
    obtaining at least one user interest related with the at least one virtual device content using at least one user input in the virtual session;
    obtaining correlation information between the at least one user interest and at least one content capability of a plurality of user devices of the at least one user; and
    selecting at least one user device, among the plurality of user devices, for the at least one user for transferring the context of the at least one virtual device content to the selected at least one user device based on the correlation information.

2. The method as claimed in claim 1, wherein the method further comprises connecting a plurality of VR elements in the virtual session, and
    wherein the plurality of VR elements are configured to:
    obtain a plurality of physical properties of the virtual session, wherein the plurality of physical properties comprises at least one of a gesture, movement, and context;
    render a plurality of visual elements of the virtual session; and
    provide information regarding starting and ending of the virtual session.

3. The method as claimed in claim 1, wherein the at least one virtual device content comprises at least one of an audible content, a visual content, an audio-visual content, and an ambience of the virtual session.

4. The method as claimed in claim 1, wherein the at least one user interest is obtained using at least one of an explicit user action and an implicit user action in the virtual session.

5. The method as claimed in claim 1, wherein the at least one content capability of the plurality of user devices comprises at least one of an audio capability, a video capability, an internet capability, a display capability, and an ambience control capability.

6. The method as claimed in claim 1, wherein the obtaining the context of the at least one virtual device content comprises:
    scanning a virtual environment in which the virtual session takes place for identifying the at least one virtual device content displayed in the virtual session which is originating from at least one participating user or a central entity;
    applying a detecting mechanism to the identified at least one virtual device content; and
    obtaining the context of the at least one virtual device content, based on the detecting mechanism.

7. The method as claimed in claim 1, wherein the at least one user input comprises at least one of a speech input, a gaze input, and a gesture input.

8. The method as claimed in claim 1, wherein the obtaining the at least one user interest using the at least one user input comprises:
    detecting at least one avatar action of the at least one user;
    obtaining correlation information between the at least one avatar action and a plurality of interests of the at least one user;
    classifying between objects in the environment external to the virtual session and the virtual session to determine an intent of the at least one user; and
    obtaining the at least one user interest based on the intent of the at least one user.

9. The method as claimed in claim 1, wherein the obtaining the correlation information comprises:
    obtaining at least one user activity in the environment external to the virtual session for identifying at least one real-world context relevant to the obtained at least one user interest;
    classifying each of the plurality of user devices into a data structure that lists one or more capabilities of a respective user device, the at least one content capability of the plurality of user devices extracted from a respective data structure;

identifying the user devices which are in proximity of the at least one user; and obtaining the data structures and stored metadata information of the at least one user interest for identifying and providing the at least one user device from the user devices in proximity of the at least one user for transferring the context of the at least one virtual device content.

10. The method as claimed in claim 1, wherein the virtual session is implemented in a metaverse environment.

11. The method as claimed in claim 1, wherein the electronic device is present in the environment external to the virtual session.

12. An electronic device for enabling context transfer from a virtual session to an environment external to the virtual session, the electronic device comprising:
a processor configured to:
detect at least one user in the virtual session;
based on detecting the at least one user, obtain a context of at least one virtual device content present in the virtual session;
obtain at least one user interest related with the at least one virtual device content using at least one user input in the virtual session;
obtain correlation information between the at least one user interest and at least one content capability of a plurality of user devices of the at least one user; and
select at least one user device, among the plurality of user devices, for the at least one user,
wherein the context of the at least one virtual device content is transferred to the at least one user device based on the correlation information.

13. A system for enabling context transfer from a virtual session to an environment external to the virtual session, the system comprising:
a processor configured to operate the virtual session using at least one electronic device,
wherein the processor comprises a plurality of virtual modules,
wherein each of the plurality of virtual modules comprises:
a session manager configured to detect at least one user in the virtual session;
a virtual scanner configured to, based on detecting the at least one user, obtain a context of at least one virtual device content present in the virtual session;
an interest detection module configured to obtain at least one user interest related with the at least one virtual device content using at least one user input in the virtual session through a multimodal interest engine; and
a plurality of user device modules, and
wherein each of the plurality of user device modules comprises:
a capability abstractor configured to obtain correlation information between the at least one user interest and at least one content capability of a plurality of user devices of the at least one user; and
an intelligent device identification engine configured to select at least one real world device for the at least one user, and
wherein the context of the at least one virtual device content is transferred to the at least one real world device based on the correlation information.

14. The system as claimed in claim 13, wherein the system interfaces to a plurality of VR elements in the virtual session, and
wherein each of the plurality of VR elements comprises:
a physics module configured to obtain a plurality of physical properties of the virtual session, the plurality of physical properties comprising at least one of a gesture, movement, and context;
a renderer module configured to render a plurality of visual elements of the virtual session; and
a session module configured to provide information regarding starting and ending of the virtual session.

15. The system as claimed in claim 13, wherein the at least one virtual device content comprises at least one of an audible content, a visual content, an audio-visual content, and an ambience of the virtual session.

* * * * *